US012402016B2

(12) United States Patent
Baldesi et al.

(10) Patent No.: US 12,402,016 B2
(45) Date of Patent: Aug. 26, 2025

(54) SYSTEM FOR FREQUENCY SHARING IN OPEN RADIO ACCESS NETWORKS USING ARTIFICIAL INTELLIGENCE

(71) Applicant: Northeastern University, Boston, MA (US)

(72) Inventors: Luca Baldesi, Boston, MA (US); Francesco Restuccia, Boston, MA (US); Tommaso Melodia, Newton, MA (US)

(73) Assignee: Northeastern University, Boston, MA (US)

( * ) Notice: Subject to any disclaimer, the term of this patent is extended or adjusted under 35 U.S.C. 154(b) by 444 days.

(21) Appl. No.: 17/944,687

(22) Filed: Sep. 14, 2022

(65) Prior Publication Data

US 2023/0079529 A1 Mar. 16, 2023

Related U.S. Application Data

(60) Provisional application No. 63/244,192, filed on Sep. 14, 2021.

(51) Int. Cl.
*H04W 16/00* (2009.01)
*H04W 16/14* (2009.01)
(Continued)

(52) U.S. Cl.
CPC ........... *H04W 16/14* (2013.01); *H04W 24/02* (2013.01); *H04W 72/0453* (2013.01)

(58) Field of Classification Search
None
See application file for complete search history.

(56) References Cited

U.S. PATENT DOCUMENTS

2020/0064782 A1* 2/2020 Li ............................ G06N 3/08
2021/0092703 A1* 3/2021 Min ..................... H04B 7/0469
(Continued)

FOREIGN PATENT DOCUMENTS

WO WO-2021212489 A1 * 10/2021 ........ H04W 72/0446
WO WO-2022124491 A1 * 6/2022 ............... G06N 3/08

OTHER PUBLICATIONS

Almeida, E. et al., "Enabling LTE/WiFi coexistence by LTE blank subframe allocation", 2013 IEEE International Conference on Communications (ICC), Wireless Communications Symposium, pp. 1-7 (2013).
(Continued)

*Primary Examiner* — Brandon M Renner
(74) *Attorney, Agent, or Firm* — Verrill Dana, LLP

(57) ABSTRACT

Methods and systems are provided for frequency sharing in RANs using artificial intelligence including scanning, by a spectrum classification unit (SCU) of a channel-aware reactive mechanism (ChARM) app, a plurality of frequencies associated with ongoing communication, classifying, by a DNN of the SCU, I/Q samples of each of the scanned frequencies, the DNN executable via the one or more of the near-RT RIC, the DU, the RU, or combinations thereof, receiving, at a policy decision unit (PDU) from the SCU, the classified frequencies, applying, by the PDU, an embedded policy to the classified frequencies, transmitting commands from the PDU to a DU for making changes to the ongoing communication according to the applied policy, receiving, at a control interface implemented in the DU, the commands transmitted by the PDU, and changing, by the DU according to the commands, an operating parameter of a RU.

20 Claims, 15 Drawing Sheets
(15 of 15 Drawing Sheet(s) Filed in Color)

(51) Int. Cl.
*H04W 24/02* (2009.01)
*H04W 72/0453* (2023.01)

(56) References Cited

U.S. PATENT DOCUMENTS

| | | | | |
|---|---|---|---|---|
| 2021/0126738 A1* | 4/2021 | Vankayala | ............ | H04W 88/08 |
| 2021/0399775 A1* | 12/2021 | Lehtimaki | ............ | H04B 7/0805 |
| 2023/0268964 A1* | 8/2023 | Hadani | ................ | H04W 16/18 375/262 |

OTHER PUBLICATIONS

Bloessl, B. et al., "An IEEE 802.11a/g/p OFDM Receiver for GNU Radio", Proceedings of the Second Workshop on Software Radio Implementation Forum (New York, NY, USA, 2013), 9-16.

Bocanegra et al., "E-Fi: Evasive Wi-Fi Measures for Surviving LTE within 5 GHz Unlicensed Band", IEEE Transactions on Mobile Computing. 18, 4 (2019), pp. 1-16.

Bonati et al., "Open, Programmable, and Virtualized 5G Networks: State-of-the-art and the Road Ahead", Computer Networks. 182, (2020), 107516, pp. 1-32.

Bonati et al., "Scope: An Open and Softwarized Prototyping Platform for NextG Systems", Proc. Of ACM intl. Conf. On mobile systems, applications, and services (MobiSys) (Virtual Conference, 2021), 12 pages.

Cano et al., Fair Coexistence of Scheduled and Random Access Wireless Networks: Unlicensed LTE/WiFi. IEEE/ACM Transactions on Networking, //arxiv.org/abs/1605.00409, (2016), 14 pages.

Challita et al., "Proactive Resource Management for LTE in Unlicensed Spectrum: A Deep Learning Perspective", IEEE Transactions on Wireless Communications. 17, 7 (2017), arXiv:1702.07031v1, pp. 1-30.

Garcia-Saavedra et al., "ORLA/OLAA: Orthogonal Coexistence of LAA and WiFi in Unlicensed Spectrum", IEEE/ACM Transactions on Networking, (2018), pp. 1-15.

Gawlowicz et al., "Enabling Cross-technology Communication between LTE Unlicensed and WiFi", IEEE Infocom 2018—IEEE Conference on Computer Communications, (2018), 9 pages.

Gomez-Miguelez et al., "srsLTE: An open-source platform for LTE evolution and experimentation", Proceedings of the Tenth ACM International Workshop on Wireless Network Testbeds, Experimental Evaluation and Characterization (2016), 8 pages.

Guan et al., "CU-LTE: Spectrally-Efficient and Fair Coexistence Between LTE and Wi-Fi in Unlicensed Bands", Proc. Of IEEE Conference on Computer Communications (Infocom) (2016), 9 pages.

Harris et al., "Digital receivers and transmitters using polyphase filter banks for wireless communications", IEEE Transactions on Microwave Theory and Techniques. 51, 4, pp. 1395-1412 (2003).

He et al., "Deep Residual Learning for Image Recognition", Proceedings of the IEEE conference on computer vision and pattern recognition, (CVPR) (2016), pp. 770-778.

Horwitz, J., "Wi-Fi 6E and 5G Will Share 6GHz Spectrum to Supercharge Wireless Data", Venture Beat 2020, downloaded from //tinyurl.com/wyvmn5c, 6 pages.

Kosta et al., "On interference avoidance through inter-cell interference coordination (ICIC) based on OFDMA mobile systems", IEEE Communications Surveys Tutorials. 15, 3 (2013), pp. 1-23.

Liu et al., "Deep Gamblers: Learning to Abstain with Portfolio Theory", Advances in Neural Information Processing Systems (2019), pp. 1-17.

Mosleh et al., "Dynamic Spectrum Access with Reinforcement Learning for Unlicensed Access in 5G and Beyond", 2020 IEEE 91st Vehicular Technology Conference (VTC2020-Spring) (2020), pp. 1-7.

O'Shea et al., "Convolutional Radio Modulation Recognition Networks", International Conference on Engineering Applications of Neural Networks, (2016), 15 pages.

O'Shea et al., "Over-the-Air Deep Learning Based Radio Signal Classification", IEEE Journal of Selected Topics in Signal Processing, (2018), 13 pages.

Van den Oord et al., "WaveNet: A generative model for raw audio", (2016) arXiv:1609.03499, 16 pages.

Qian et al., "Multi-Operator Spectrum Sharing for Massive IoT Coexisting in 5G/B5G Wireless Networks", IEEE Journal on Selected Areas in Communications, vol. 39, No. 3, Mar. 2021, pp. 881-895.

Qualcomm Technologies, Inc., "Qualcomm ResearchLTE in Unlicensed Spectrum: Harmonious Coexistence with Wi-Fi", downloaded from qualcomm.com/content/dam/qcomm-martech/dm-assets/documents/lte-unlicensed-coexistence-whitepaper_june2014 (2014), 19 pages.

Uvaydov et al., "DeepSense: Fast Wideband Spectrum Sensing Through Real-Time In-the-Loop Deep Learning", IEEE Infocom 2021—IEEE Conference on Computer Communications, 10 pages.

Yang et al., "Blind LTE-U/WiFi Coexistence System Using Convolutional Neural Network", IEEE Access. 8, (2020), pp. 15923-15930.

Yun et al., "Supporting WiFi and LTE co-existence", 2015 IEEE Conference on Computer Communications (Infocom) (2015), 9 pages.

Chen, Q. et al. 2016. Optimizing Unlicensed Spectrum Sharing for LTE-U and WiFi Network Coexistence. IEEE Journal on Selected Areas in Communications. 34, 10 (2016), pp. 2562-2574.

Gao et al., "Achieving Proportional Fairness for LTE-LAA and Wi-Fi Coexistence in Unlicensed Spectrum", IEEE Transactions on Wireless Communications. 19, 5 (2020), pp. 3390-3404.

Huang et al., "Deep Learning for Physical-Layer 5G Wireless Techniques: Opportunities, Challenges and Solutions", IEEE Wireless Communications. 27, 1 (2020), pp. 214-222.

Tan et al., QoS-Aware User Association and Resource Allocation in LAA-LTE/WiFi Coexistence Systems. IEEE Transactions on Wireless Communications. 18, 4 (2019), pp. 2415-2430.

Tarver et al., Enabling a Use-or-Share Framework for PAL—GAA Sharing in CBRS Networks via Reinforcement Learning. IEEE Transactions on Cognitive Communications and Networking. 5, 3 (2019), pp. 716-729.

\* cited by examiner

SYSTEM FOR FREQUENCY SHARING IN OPEN RADIO ACCESS NETWORKS USING ARTIFICIAL INTELLIGENCE

CROSS REFERENCE TO RELATED APPLICATIONS

This application claims benefit under 35 U.S.C. § 119(e) of U.S. Provisional Application No. 63/244,192, filed on 14 Sep. 2021, entitled "Channel-Aware Reactive Mechanism (ChARM)," the entirety of which is incorporated by reference herein.

STATEMENT REGARDING FEDERALLY SPONSORED RESEARCH OR DEVELOPMENT

This invention was made with government support under Grant No.: 1923789 awarded by the U.S. National Science Foundation. The government has certain rights in the invention.

BACKGROUND

According to the new Cisco Annual Internet Report, 5G and beyond (NextG) networks will support more than 10% of the world's mobile connections by 2023, with more than 5.7B users—70% of the global population—using mobile cellular connectivity. Due to this sheer growth in wireless demand, current spectrum bands below 6 GHz will inevitably become saturated. For this reason, the FCC has recently opened 1.2 GHz of spectrum in the 6 GHz band, basically quadrupling the amount of space available for routers and other unlicensed devices. Moreover, 150 MHz of spectrum in the CBRS band can now be accessed, shared with incumbent radar communications.

As new spectrum bands become open for unlicensed usage, it becomes crucial to protect incumbent users (i.e., previous license owners), as well as establishing fair coexistence among unlicensed users. For example, it has been demonstrated that Wi-Fi throughput can drop up to 70% without a dedicated LTE co-existence mechanism. To this end, spectrum sharing has emerged as a technology which promises to fuel wireless growth in these bands. Spectrum sharing enables multiple categories of users to opportunistically select frequencies and bandwidth of operation, according to given constraints (e.g., band limits and incumbent priorities).

Although spectrum sharing represents one of the few options to address the current spectrum scarcity below 6 GHz, today's radio access networks (RANs) are monolithic entities, which often operate statically on given set of parameters for the entirety of their operations. Conversely, to implement realistic and effective spectrum sharing policies, RANs will need to seamlessly and intelligently change their operational parameters. Due to the dynamic nature of spectrum policies and the unpredictability of unlicensed usage, spectrum sharing will require radio access networks (RANs) to change their operational parameters intelligently and according to the current spectrum context.

A significant amount of prior work has tackled spectrum sharing in the ISM band, primarily targeting spectrum sharing between LTE and WiFi. Current approaches can be classified as: collaborative, which need active communication between LTE and WiFi nodes, and non-collaborative, which instead do not assume any side-channel information for co-existence. Among the collaborative approaches, Chen et al. envision the creation of a LTE/WiFi super node, internally optimizing the spectrum usage fairness. Gawlowicz et al. design a framework for side channel communication between WiFi access points and LTE base stations (BSs). These approaches, along with the one by Bocanegra et al. that modifies the WiFi access point software, are challenging to deploy in practice, and hardly extensible to consider other technologies beyond LTE and WiFi. Some prior approaches achieve co-existence at the physical layer (PHY). The work by Yun et al. focuses on interference cancellation and beamforming exploiting multiple radio antennas. Almeida et al. focus on exploiting a 3GPP standard feature, the ABS, to make LTE BSs avoid scheduling traffic for a periodic portion of time and allow co-existing CSMA/CA based system to transmit. This work paved the way for the standardization of LTE-U, originally proposed by Qualcomm, as a mean of intra-channel LTE co-existence. Guan and Melodia mathematically modeled the fairness of LTE-U systems and proposed algorithms to maximize throughput under fairness constraints.

The solutions based on LTE-U could not be deployed in Europe and Japan, where regulations impose to use a LBT mechanism (CSMA/CA-like) to access the ISM band. Hence, 3GPP standardized another technique called LTE-LAA, which is an extension to LTE enabling LBT. Several works stemmed from this standardization effort; Challita et al., and later, Tan et al., propose to employ ML to forecast Wi-Fi transmission and optimize LTE consequently. Garcia Saavedra et al. raised attention on LTE-LAA unfairness cases and propose optimizing parameters to minimize them; Gao and Roy addressed instead the unfairness by modeling LTE-LAA communications with Markov models. In general, LTE-U and LTE-LAA based solutions focus on intra-channel spectrum sharing. Huang et al., instead, propose to achieve a fair co-existence between LTE and WiFi transmission by inter-channel optimization through a real-time intensive CUDA computation. Qian et al. address the problem of centralized spectrum allocation among different mobile network operators (MNOs). The approach by Mosleh et al. presents an ML framework to optimize the spectrum usage by LTE and WiFi. However, it does not include sensing functions and its application is limited to those two technologies.

Tarver et al. presented a solution for sensing and reacting nodes for the CBRS context and Uyadov et al. propose a sensing and reacting framework optimizing the usage of fragmented, unused portions (holes) of spectrum. However, these approaches require deep modifications of the 3GPP and 802.11 standards, which ultimately makes them not readily adaptable to state-of-the-art O-RAN networks.

In summary, some solutions rely on a centralized orchestrating node, do not actively sense the state of the spectrum, or are inherently limited to two technologies (LTE and WiFi). Moreover, legacy approaches do not allow the customization of the behavior by the MNO and are not compatible with O-RAN specifications. Conversely, operators should be able to specify customized reactions tailored to the sensed technology and the band of operation.

In addition to the shortcomings discussed above, none of the prior art discussed above attempts to provide a full-fledged Open RAN based framework for sensing and reacting cells, while maintaining full compatibility with the 3GPP standard.

SUMMARY

Provided herein are methods and systems for frequency sharing in open radio access networks using artificial intelligence which provide innovative, automated, and scalable solutions to these challenges, including automated channel-aware reactive frequency sharing frameworks for open radio access networks (Open RAN).

In one aspect, a method for frequency sharing in radio access networks (RANs) using artificial intelligence is provided. The method includes scanning, by a spectrum classification unit (SCU) of a channel-aware reactive mechanism (ChARM) app, a plurality of frequencies associated with ongoing communication, the ChARM app executable in the RAN via one or more of a near-RT RIC, a distributed unit (DU), a radio unit (RU), or combinations thereof. The method also includes classifying, by a deep neural network (DNN) of the SCU, I/Q samples of each of the scanned frequencies, the DNN executable via the one or more of the near-RT RIC, the DU, the RU, or combinations thereof. The method also includes receiving, at a policy decision unit (PDU) of the ChARM from the SCU, the classified frequencies. The method also includes applying, by the PDU, an embedded policy to the classified frequencies. The method also includes transmitting commands from the PDU to a distributed unit (DU) of the RAN for making changes to the ongoing communication according to the applied policy. The method also includes receiving, at a control interface implemented in the DU, the commands transmitted by the PDU. The method also includes changing, by the DU according to the commands, an operating parameter of a radio unit (RU) of the RAN.

In some embodiments, the DNN includes at least one of a convolutional neural network (CNN) and a residual network (RN). In some embodiments, the DNN includes a fully-connected layer. In some embodiments, the fully connected layer includes at least one of an FC/Tan h, or an FC/Softmax. In some embodiments, the step of classifying includes assigning to each frequency, by the DNN, a technology label to generate an associative map. In some embodiments, the policy prescribes, based on each of a plurality of possible classification-frequency combinations, changes to at least one of a frequency, an intra-frequency spectrum sharing mechanism, a bandwidth, a transmission power of the RU, or a transmission gain of the RU. In some embodiments, the step of applying includes calling the embedded policy. In some embodiments, the step of applying includes executing the embedded policy against the associative map. In some embodiments, the step of applying includes determining a prescribed one of the changes to the at least one of the frequency, the intra-frequency spectrum sharing mechanism, the bandwidth, the transmission power of the RU, or the transmission gain of the RU. In some embodiments, the at least one operating parameter includes at least one of a frequency, an intra-frequency spectrum sharing mechanism, a bandwidth, a transmission power of the RU, or a transmission gain of the RU. In some embodiments, the intra-frequency sharing mechanism includes at least one of LTE-U, LTE-LAA, MulteFire, increasing of ABS periods for co-existence with WiFi, or establishing of an X2 interface and subsequent coordination via 3GPP ICIC techniques for co-existence with one or more LTE base stations. In some embodiments, the method also includes transmitting, from the DU via the RU, a message handover through a radio resource control (RRC) to at least one user equipment (UE) device to change an operating parameter of the UE corresponding the changed operating parameter of the RU.

In another aspect, a system for frequency sharing in open radio access network (RAN) networks using artificial intelligence. The system includes a RAN having a plurality of RAN resources including a near-real-time (near-RT) RAN intelligent controller (RIC), a distributed unit (DU), and a radio unit (RU). The system also includes a channel-aware reactive mechanism (ChARM) app executable in the RAN via the near-RT RIC, the DU, the RU, or combinations thereof. The ChARM app includes a spectrum classification unit (SCU). The SCU is configured to scan a plurality of frequencies associated with ongoing communication. The SCU is also configured to execute a deep neural network (DNN) to classify I/Q samples of each of the scanned frequencies, the DNN executable via the one or more of the near-RT RIC, the DU, the RU, or combinations thereof. The ChARM app also includes a policy decision unit (PDU). The PDU is configured to receive, from the SCU, the classified frequencies. The PDU is also configured to apply an embedded policy to the classified frequencies. The PDU is also configured to transmit commands to the DU for making changes to the ongoing communication according to the applied policy. The system also includes a control interface implemented in the DU for receiving the commands transmitted by the PDU and changing, according to the commands, an operating parameter of the RU.

In some embodiments, the DNN includes at least one of a convolutional neural network (CNN) and a residual network (RN). In some embodiments, the DNN includes a fully-connected layer. In some embodiments, the fully connected layer includes at least one of an FC/Tan h, or an FC/Softmax. In some embodiments, the DNN of the SCU, when classifying the I/Q samples of each of the scanned frequencies, is configured to assign to each frequency a technology label to generate an associative map. In some embodiments, the policy prescribes, based on each of a plurality of possible classification-frequency combinations, changes to at least one of a frequency, an intra-frequency spectrum sharing mechanism, a bandwidth, a transmission power of the RU, or a transmission gain of the RU. In some embodiments, the PDU, when applying the embedded policy to the classified frequencies, is configured to call the embedded policy. In some embodiments, the PDU, when applying the embedded policy to the classified frequencies, is configured to execute the embedded policy against the associative map. In some embodiments, the PDU, when applying the embedded policy to the classified frequencies, is configured to determine a prescribed one of the changes to the at least one of the frequency, the intra-frequency spectrum sharing mechanism, the bandwidth, the transmission power of the RU, or the transmission gain of the RU. In some embodiments, the at least one operating parameter includes at least one of a frequency, an intra-frequency spectrum sharing mechanism, a bandwidth, a transmission power of the RU, or a transmission gain of the RU. In some embodiments, the intra-frequency sharing mechanism includes at least one of LTE-U, LTE-LAA, MulteFire, increasing of ABS periods for co-existence with WiFi, or establishing of an X2 interface and subsequent coordination via 3GPP ICIC techniques for co-existence with one or more LTE base stations. In some embodiments, the DU is further configured to transmit, via the RU, a message handover through a radio resource control (RRC) to at least one user equipment (UE) device to change an operating parameter of the UE corresponding the changed operating parameter of the RU.

Additional features and aspects of the technology include the following:

1. A method for frequency sharing in radio access networks (RANs) using artificial intelligence comprising:

scanning, by a spectrum classification unit (SCU) of a
channel-aware reactive mechanism (ChARM) app, a
plurality of frequencies associated with ongoing
communication, the ChARM app executable in the
RAN via one or more of a near-RT RIC, a distributed
unit (DU), a radio unit (RU), or combinations
thereof;
classifying, by a deep neural network (DNN) of the
SCU, I/Q samples of each of the scanned frequencies, the DNN executable via the one or more of the
near-RT RIC, the DU, the RU, or combinations
thereof;
receiving, at a policy decision unit (PDU) of the
ChARM from the SCU, the classified frequencies;
applying, by the PDU, an embedded policy to the
classified frequencies;
transmitting commands from the PDU to a distributed
unit (DU) of the RAN for making changes to the
ongoing communication according to the applied
policy;
receiving, at a control interface implemented in the DU,
the commands transmitted by the PDU; and
changing, by the DU according to the commands, an
operating parameter of a radio unit (RU) of the RAN.

2. The method of feature 1, wherein the DNN further comprises at least one of a convolutional neural network (CNN) and a residual network (RN).

3. The method of any of features 1-2, wherein the DNN further comprises a fully-connected layer.

4. The method of feature 3, wherein the fully connected layer includes at least one of an FC/Tan h, or an FC/Softmax.

5. The method of any of features 1-4, wherein the step of classifying further comprises assigning to each frequency, by the DNN, a technology label to generate an associative map 6. The method of feature 5, wherein the policy prescribes, based on each of a plurality of possible classification-frequency combinations, changes to at least one of a frequency, an intra-frequency spectrum sharing mechanism, a bandwidth, a transmission power of the RU, or a transmission gain of the RU.

7. The method of feature 6, wherein the step of applying further comprises
calling the embedded policy;
executing the embedded policy against the associative map; and
determining a prescribed one of the changes to the at least one of the frequency, the intra-frequency spectrum sharing mechanism, the bandwidth, the transmission power of the RU, or the transmission gain of the RU 8. The method of any of features 1-7, wherein the at least one operating parameter includes at least one of a frequency, an intra-frequency spectrum sharing mechanism, a bandwidth, a transmission power of the RU, or a transmission gain of the RU.

9. The method of feature 8, wherein the intra-frequency sharing mechanism includes at least one of LTE-U, LTE-LAA, MulteFire, increasing of ABS periods for co-existence with WiFi, or establishing of an X2 interface and subsequent coordination via 3GPP ICIC techniques for co-existence with one or more LTE base stations.

10. The method of any of features 1-9, further comprising transmitting, from the DU via the RU, a message handover through a radio resource control (RRC) to at least one user equipment (UE) device to change an operating parameter of the UE corresponding the changed operating parameter of the RU.

11. A system for frequency sharing in open radio access network (RAN) networks using artificial intelligence comprising:
a RAN having a plurality of RAN resources including a near-real-time (near-RT) RAN intelligent controller (RIC), a distributed unit (DU), and a radio unit (RU);
a channel-aware reactive mechanism (ChARM) app executable in the RAN via the near-RT RIC, the DU, the RU, or combinations thereof the ChARM app including:
a spectrum classification unit (SCU) configured to:
scan a plurality of frequencies associated with ongoing communication; and
execute a deep neural network (DNN) to classify I/Q samples of each of the scanned frequencies, the DNN executable via the one or more of the near-RT RIC, the DU, the RU, or combinations thereof;
a policy decision unit (PDU) configured to:
receive, from the SCU, the classified frequencies;
apply an embedded policy to the classified frequencies; and
transmit commands to the DU for making changes to the ongoing communication according to the applied policy; and
a control interface implemented in the DU for receiving the commands transmitted by the PDU and changing, according to the commands, an operating parameter of the RU.

12. The system of feature 11, wherein the DNN further comprises at least one of a convolutional neural network (CNN) and a residual network (RN).

13. The system of feature 12, wherein the DNN further comprises a fully-connected layer.

14. The system of feature 13, wherein the fully connected layer includes at least one of an FC/Tan h, or an FC/Softmax.

15. The system of any of features 11-14, wherein the DNN of the SCU, when classifying the I/Q samples of each of the scanned frequencies, is further configured to assign to each frequency a technology label to generate an associative map 16. The system of feature 15, wherein the policy prescribes, based on each of a plurality of possible classification-frequency combinations, changes to at least one of a frequency, an intra-frequency spectrum sharing mechanism, a bandwidth, a transmission power of the RU, or a transmission gain of the RU.

17. The system of feature 16, wherein the PDU, when applying the embedded policy to the classified frequencies, is further configured to:
call the embedded policy;
execute the embedded policy against the associative map; and
determine a prescribed one of the changes to the at least one of the frequency, the intra-frequency spectrum sharing mechanism, the bandwidth, the transmission power of the RU, or the transmission gain of the RU.

18. The system of any of features 11-17, wherein the at least one operating parameter includes at least one of a frequency, an intra-frequency spectrum sharing mechanism, a bandwidth, a transmission power of the RU, or a transmission gain of the RU.

19. The system of feature 18, wherein the intra-frequency sharing mechanism includes at least one of LTE-U, LTE-LAA, MulteFire, increasing of ABS periods for co-existence with WiFi, or establishing of an X2 interface and subsequent coordination via 3GPP ICIC techniques for co-existence with one or more LTE base stations.

20. The system of any of features 11-19, wherein the DU is further configured to transmit, via the RU, a message handover through a radio resource control (RRC) to at least one user equipment (UE) device to change an operating parameter of the UE corresponding the changed operating parameter of the RU.

DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
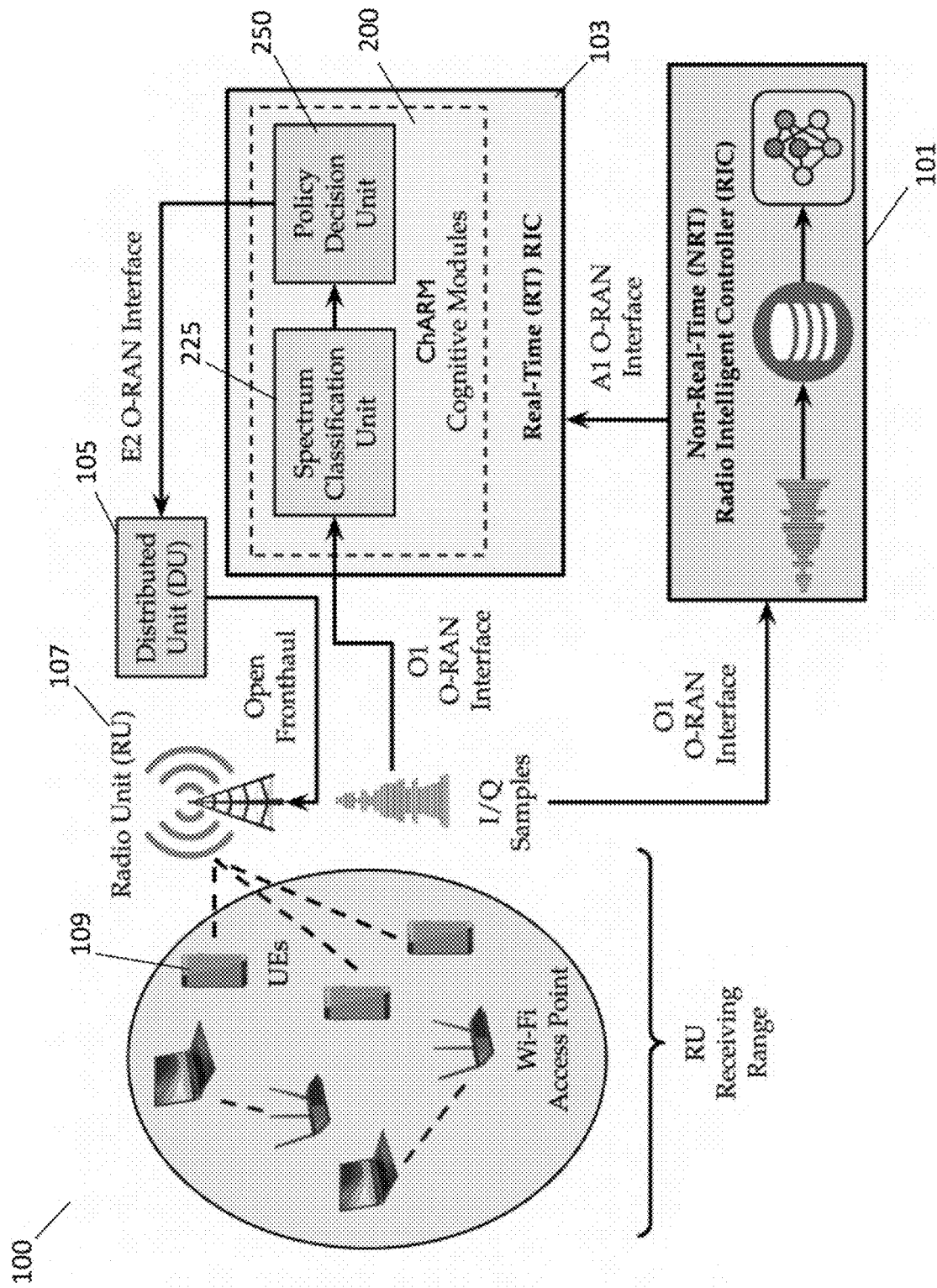
FIG. 1 illustrates an overview of an O-RAN-based ChARM spectrum-sharing framework in accordance with various embodiments.

As described in detail above, 3GPP compatible spectrum-sharing in the Open RAN presents unprecedented and unique challenges. Provided herein are methods and systems for frequency sharing in Open RAN networks using artificial intelligence which provide innovative, automated, and scalable solutions to these challenges having a Channel-Aware Reactive Mechanism (ChARM). As described herein, ChARM includes Open RAN based framework for sensing and reacting cells, while maintaining full compatibility with the 3GPP standard.

For convenience and ready understanding by persons of skill in the art, O-RAN nomenclature (e.g., xApp, E2, O1, A1 etc.) is used throughout this disclosure. However, while O-RAN is a clear leader in standardizing the Open RAN architecture, it should also be noted that other organizations such as, for example, the Telecom Infra Project (TIP), are also working in this area. Therefore, it will be apparent in view of this disclosure that, although O-RAN nomenclature is used throughout for convenience, the systems and methods provided herein can be used in connection with any Open RAN architecture in accordance with various embodiments.

In stark contrast with existing paradigms, the new O-RAN architectures for 5G-and-beyond networks (NextG) separate the logic that controls the RAN from its hardware substrate, allowing unprecedented real-time fine-grained control of RAN components. In this context, a channel-aware reactive mechanism (ChARM) is provided.

At a high level, ChARM is a dynamic wireless communication reconfiguration mechanism which leverages machine learning for classifying the communication traffic on a set of given frequencies and changing on the fly the wireless channel properties with the goal of improving wireless spectrum sharing. ChARM performs both intra- and inter-frequency spectrum sharing techniques. It is 3GPP compliant and designed to be deployed in a O-RAN network infrastructure.

As described herein, ChARM is a data-driven Open RAN (and O-RAN)-compliant framework designed to be executed as an xApp (or equivalent) at a near-real-time RIC ("near-RT RIC"). However, it will be apparent in view of this disclosure that ChARM as a whole and/or any one or more of its constituent components can also be located at and/or executed by at least one of a distributed unit (DU) and a radio unit (RU). It will further be apparent in view of this disclosure that, although presented in the context of Open RAN (including O-RAN) frameworks and compliant therewith, the methods and systems for frequency sharing in Open RAN networks using artificial intelligence described herein can also be used with a conventional RAN. For example, one or more conventional RUs could be installed with ChARM and any necessary corresponding hardware in order to provide frequency sharing independent of Open RAN connectivity or compatibility.

Regardless of where ChARM and/or its constituent components are executed, ChARM provides abilities and functionalities for (i) sensing the spectrum to infer the presence of interference and (ii) reacting in real time by switching the distributed unit (DU) and/or RU operational parameters according to a specified spectrum access policy. ChARM is based on neural networks operating directly on unprocessed I/Q waveforms to determine the current spectrum context. ChARM does not require any modification to the existing 3GPP standards, is designed to operate within Open RAN specifications, and can be used in conjunction with other spectrum sharing mechanisms (e.g., LTE-U, LTE-LAA or MulteFire).

The performance of ChARM was demonstrated in the context of spectrum sharing among LTE and Wi-Fi in unlicensed bands, where a controller operating over a RAN Intelligent Controller (RIC) senses the spectrum and switches cell frequency to avoid Wi-Fi. A full-fledged standard-compliant prototype of ChARM was developed using srsRAN and leveraging the Colosseum channel emulator to collect a large-scale waveform dataset to train the neural networks with. To collect standard-compliant Wi-Fi data, the Colosseum testbed was extended using system-on-chip (SoC) boards running a modified version of the OpenWiFi architecture. Experimental results show that ChARM achieves accuracy of up to 96% on Colosseum and 85% on an over-the-air testbed, demonstrating the capacity of ChARM to fully exploit the considered spectrum channels.

Although existing RANs do not allow real-time reconfiguration, the fast-paced rise of the Open RAN movement and of the O-RAN framework for 5G-and-beyond (NextG) networks, where the hardware and software portions of the RAN are logically disaggregated, will allow seamless reconfiguration and optimization of the radio components. Despite their compelling necessity, there are no O-RAN-ready technologies that can drive real-time RAN optimization.

For this reason, a system for frequency sharing in Open RAN networks using artificial intelligence is presented herein, including a channel-aware reacting mechanism framework (ChARM). FIG. 1 shows a high-level overview of a system 100 for frequency sharing in Open RAN networks using artificial intelligence including ChARM 200 and its main logical components, including the O-RAN interfaces used to collect and exchange data among the different components. ChARM 200 is a data-driven framework that enables RAN owners to (i) sense the spectrum to understand the current context through a SCU 225; (ii) react in real time by switching the DU 105 and RU 107 operational parameters according to a specified spectrum access policy decided by PDU 250. As shown in FIG. 1, both SCU 225 and PDU 250 are located in the O-RAN near-real-time RIC 103, which receives input by the non-real-time RIC 101. The latter is tasked with (i) collecting the spectrum I/Q data and creating a dataset; (ii) training and testing the machine learning (ML) algorithms that are eventually deployed onto the near-real-time RIC through the A1 interface.

However, as noted above, it will be apparent in view of this disclosure that ChARM 200 as a whole and/or any one or more of its constituent components (e.g., the SCU 225, the PDU 250, can also be located at and/or executed by at least one of the DU 105 and the RU 107.

Figure 2:
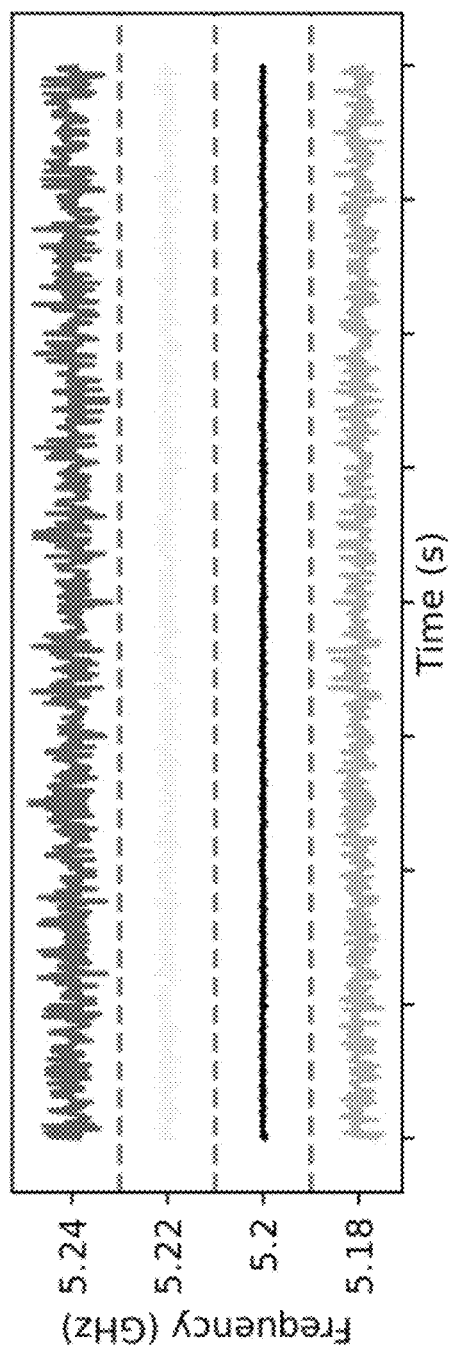
FIG. 2 illustrates spectrum sensing based on different frequencies wherein the sensing bandwidth is set to 20 MHz (the LTE channel bandwidth in the ISM band). Some channels present radio signals, but their identification as legitimate communication or just noise requires a classifier.
Figure 3:
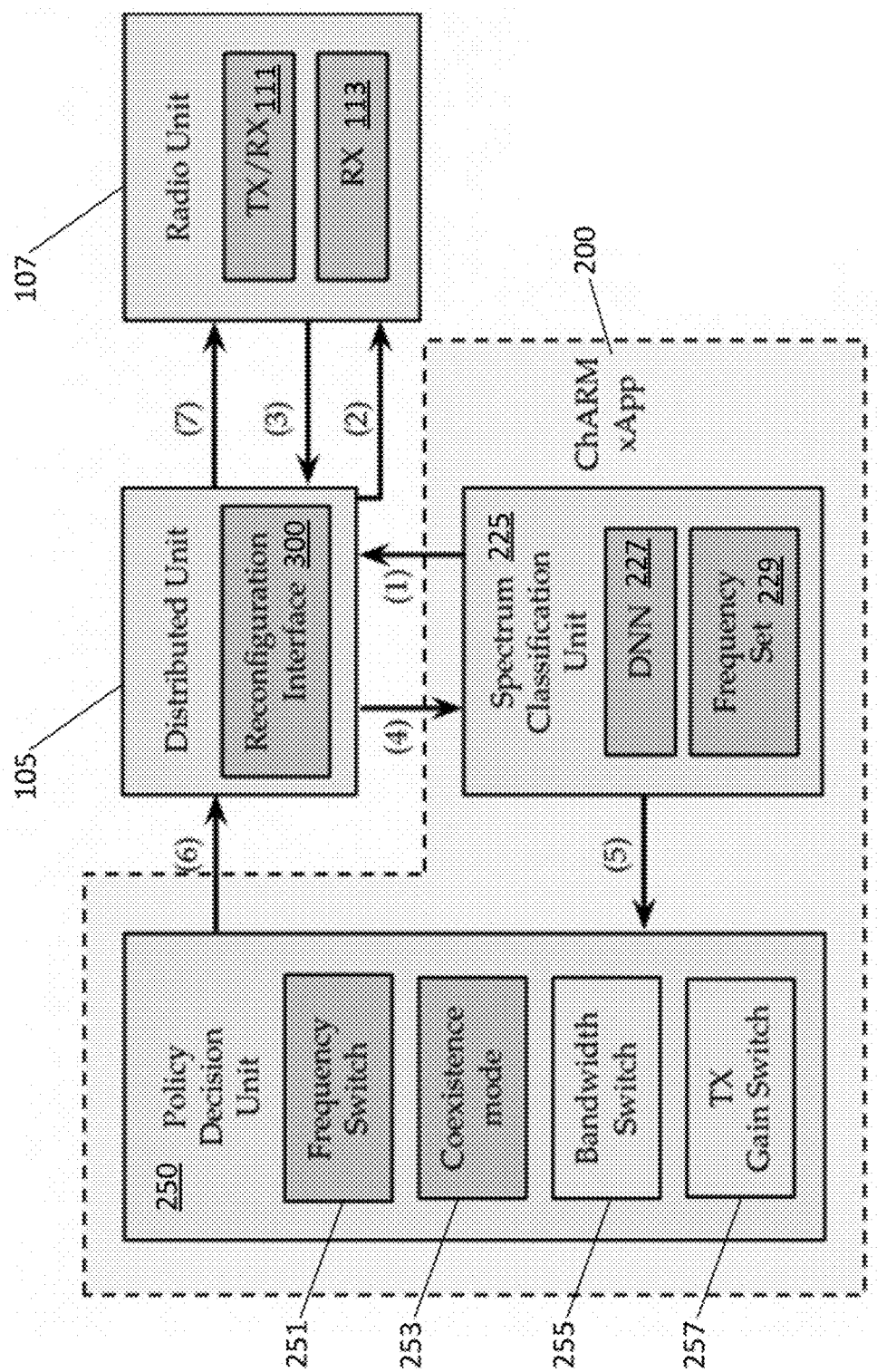
FIG. 3 illustrates a ChARM system framework, wherein sub-blocks in the Policy Decision Unit indicate possible reacting strategies in accordance with various embodiments.

Referring now to FIGS. 1 and 3, ChARM 200 advantageously provides Open RAN networks with the capability to intelligently determine which wireless technology is utilizing the spectrum, so that intelligent spectrum policies can be implemented. To this end, the SCU 225 of ChARM 200 leverages DNN 227 trained on unprocessed I/Q samples to classify communication technologies with low latency. Different from prior work, however, the classifiers described herein include an abstain class to minimize misclassifications of unknown wireless technologies (something likely in the ISM band). FIG. 2 shows an example of spectrum occupation in the ISM band between 5.18 and 5.24 GHz, where different wireless technologies are utilizing the spectrum. According to the given spectrum utilization rule, the PDU unit of ChARM 200 may decide to switch to the empty 5.2 GHz band, also called inter-channel sharing, or activate a co-existence mechanism inside the occupied channel, such as (LTE-U, LTE-LAA or MulteFire). This methodology is called intra-channel sharing.

The systems and methods described herein present the first framework providing the capabilities defined above to O-RAN-ready networks. In this context, descriptions herein include (i) explanation of the need for a large waveform dataset to train the DNN 227 with, and (ii) description of development of a real-time working prototype. To experiment in both emulated and over-the-air channels, a prototype was developed for both the Colosseum channel emulator and the over-the-air Arena testbed. Colosseum enables researchers and practitioners to control the wireless channel environment while using state-of-the-art SDR devices. While Colosseum has not been designed to work with Wi-Fi devices, Colosseum was extended with new hardware in the loop, proving its extreme flexibility and extensibility. The prototypes prove that ChARM 200 is fully O-RAN-ready and can interact with the current 3GPP and 802.11 standards, and it is designed to be used in combination with any other intra-channel mechanisms.

The systems and methods described herein include at least the following novel technical contributions: ChARM 200, an Open RAN-based framework for spectrum sharing in the ISM band. ChARM 200 can include (i) a spectrum classification unit (SCU 225) based on DNNs for real-time spectrum classification, (ii) a policy decision unit (PDU) that defines the actions to be taken upon the inference produced by the SCU 225.

A ChARM 200 prototype is described based on standard-compliant srsRAN software. Through this prototype, ChARM 200 was demonstrated in the context of spectrum sharing among LTE and Wi-Fi in unlicensed bands, where the RU 107 reactively switches cell frequency to avoid Wi-Fi according to the DNN 227-based SCU 225 inference. The Colosseum channel emulator was used to collect a large-scale waveform dataset to train neural networks with. To collect standard-compliant Wi-Fi data, the Colosseum testbed was extended using SoC boards, running a patched version of OpenWiFi, an 802.11a/g/n implementation specifically designed for SoC boards. The feasibility of the described systems and methods was demonstrated by deploying the software and the DNN 227 model, trained on Colosseum, in a wireless testbed, Arena (both the Arena and Colosseum are open testbed accessible by third parties), and operating it in the ISM band with incumbent WiFi communications. Experimental results show that the neural networks described herein achieve accuracy of up to 96% on Colosseum and 85% on Arena, demonstrating the capacity of ChARM 200 to fully exploit the considered spectrum channels;

The ChARM Framework

Background Regarding O-RAN

O-RAN and the NextG architecture are based on the 3GPP functionality split. The functionalities of the base stations are virtualized and disaggregated, often running on multiple physical nodes. These functionalities are grouped in CU, DU 105, and RU. Specifically, while CU deals with protocols higher in the stack, DU 105 is responsible for time-critical operations (including most baseband processing), while the RU 107 is in charge of radio frequency and of some PHY functionalities (e.g., beamforming, fast Fourier transforms).

Moreover, O-RAN has been designed to embrace programmatic control based on ML and on the open-source paradigm. For this reason, it exposes analytics and control knobs through the non-real-time RIC and the near-real-time RIC. These two components are responsible of the intelligent control of the network. The former handles operations with coarse time granularity (such as training a DNN 227 model, orchestration of containers, among others), while the latter handles operations that need to be performed within a second, for example, the inference of a DNN 227 model. The near-real-time RIC also allows running customized network functions (called xApps), which MNO can install in their nodes. ChARM 200 has been specifically tailored to be deployed as an xApp in the near-real-time RIC and integrated in the NextG architecture.

Overview of ChARM

FIG. 3 represents a high-level overview of the main logical components of ChARM 200 in the context of O-RAN. The framework requires at least two co-located radios, one for mobile network communications (indicated with TX/RX 111), and another for sensing (indicated with RX). Moreover, ChARM 200 is composed of (i) a spectrum classification unit (SCU) 225 responsible of scanning various given frequencies and classify each of them, which comprises of a pre-defined set of frequencies to evaluate and a DNN 227 for I/Q sample classification, (ii) a policy decision unit (PDU) 250 which takes as input the latest frequency evaluation by the classifier, embeds a policy which can be customized by the operator, and communicates to the DU 105 unit the changes to apply to the on-going communication, and (iii) the DU 105, which implements the control interface to receive commands from the PDU.

A walk-through. FIG. 3 provides an overview of the key operations of ChARM 200. While the RU 107 can be communicating with zero or more user equipment devices (UE) 109, the SCU 225 periodically indicates to the DU 105 (step 1) to reconfigure the RX radio to a different frequency (step 2). Then, the DU 105 collects I/Q samples (step 3), which are fed to the SCU 225 (step 4). Then, the SCU 225 classifies the samples through the DNN 227 and the result (i.e., frequency and class) is provided to the PDU (step 5). The PDU is thus aware of (i) which frequency the RU 107 is using for mobile communication, (ii) which is its latest assigned class, and (iii) the classes assigned to the other frequencies under sensing. The PDU may react to the sensed spectrum state triggering one or multiple of its functionalities, for example:

Frequency switch 251, which makes the RU 107 change center frequency;

Coexistence mode 253, which enables or disables a specific coexistence mechanism of the RU;

Bandwidth switch 255, which changes the signal bandwidth in the ISM band;

TX gain switch 257, changes transmission gain (in dB) of the RU.

The chosen reacting functions depend on the sensed spectrum state and the network operator policy, and they are sent to the DU 105 (step 6). The DU 105 adapts the spectrum usage with respect to the received commands (step 7). In the case of frequency or bandwidth switch, it communicates with the UEs 109 through a 3GPP-standard compliant reconfiguration message to grant the continuity of the ongoing communications.

Spectral Classification Unit

Sensing Procedures. Sampling a given frequency implies tuning the receiving radio and wait for the phase locked loop (PLL) to stabilize. This can take up to several tenths of seconds for each single channel to inspect. Alternatively, SDRs can be used to sense a larger portion of spectrum (multiple of channel width) and then filter out the channels of interest. While the latter does not present the inconvenience of frequency retuning, it has two main drawbacks: (i) state-of-the-art filtering, the polyphase channelizer, requires a large numbers of taps to be accurate, at the cost of being slower than retuning, and (ii) SDR maximum input bandwidth is constrained by hardware (e.g., 80 MHz on Ettus Devices USRP X310), which limits the sensing capabilities. Early experiments—not included due to space limitations— have shown the impracticability of the channelizer solution. For these reasons, ChARM 200 employs a frequency hopping sensing mechanism (frequency set 229).

DNN 227. I/Q samples represent a time series stream of data. Existing work has proven that CNNs are suitable for mining recurrent patterns and identifying key features in the wireless domain. CNNs have been used extensively for modulation and spectrum classification. However, in the computer vision field, and later in the audio processing, the concept of deep RN has emerged and has been demonstrated to be increasingly effective. For example, RNs use convolutional layers and bypass connections, allowing the stacking of significant amounts of layers and the consequent effective analysis of data at many different scales. For this reason, RNs have been applied to I/Q samples stream analysis too and are also considered in this paper.

Policy Decision Unit

The goal of the PDU is to periodically collect the latest information generated by the classifier and, according to a given policy, instruct the DU 105 on which spectrum changes to undertake. The policy is defined by an MNO to customize the PDU decisions, and it is implemented as a function evaluating the current system state, defined by the classes assigned to the frequencies under evaluation and the current communication frequency.

Procedure 1 presents a periodic routine run by the PDU. Specifically, ch classes is an associative map, assigning to each sensed frequency by the SCU 225 a technology label (e.g., 5.18→Clear, 5.20→LTE, 5.22→Unknown) generated by the DNN 227. The PDU periodic routine calls the policy function to determine the actions to perform. If the policy dictates a change of parameters, it triggers the respective operations of the DU 105 reconfiguration interface 300.

---

Procedure 1: Periodically-run PDU Routine

1: procedure PRI UPDATE(ch classes, curr f req)
2: freq, coex, pw, bw ← policy(ch classes, curr f req)
3: if curr f req 6= f req then
4:     handover(f req)
5: set coexistence(coex)
6: set tx power(pw)
7: set bw(bw)

---

Frequency switch. ChARM 200 performs a handover whenever the PDU decides to change frequency. This is handled by the frequency switch 250. In this phase, it is crucial to guarantee continuity of the session and avoid disconnections of mobile UEs 109. 3GPP standards already indicate the procedure for inter-frequency handovers, and ChARM 200 exploits it to grant standard compliant seamless handovers. The ChARM 200 RU 107 manages two cells, one of them serving the UEs 109, while the other is kept idle. When ChARM 200 changes operating frequency, (i) it changes the frequency of the idle cell with the target, and (ii) its DU 105 sends a message handover through a RRC Reconfiguration Message to the UEs 109.

Co-existence mode. ChARM 200 targets spectrum sharing optimization both at the inter-channel level and at the intra-channel level. ChARM 200 can hence work in two modes, co-existing and non-co-existing. In non-co-existing mode, the PDU makes the network nodes communicate the regular way. When the PDU dictates a handover to a frequency already occupied, it can employ co-existence mode 253 switch the DU 105 to activate a predefined co-existence technique for the detected incumbent technology. Possible mechanisms include: the increase of ABS periods for the co-existence with WiFi, and the establishment of an X2 interface and the subsequent coordination through 3GPP ICIC techniques for co-existence with LTE BSs. However, the specific choices for intra-channel spectrum sharing algorithms and performance are out of the scope of this paper, and it is assumed that, when the co-existence mode 253 is activated on a frequency with incumbent technologies, the intra-channel spectrum sharing performance is and will be improved.

ChARM Prototype

In the following sections a use-case scenario of ChARM is described, as well as a ChARM prototype design and implementation.

Use-Case Scenario: Spectrum Sharing in ISM Bands

Figure 4:
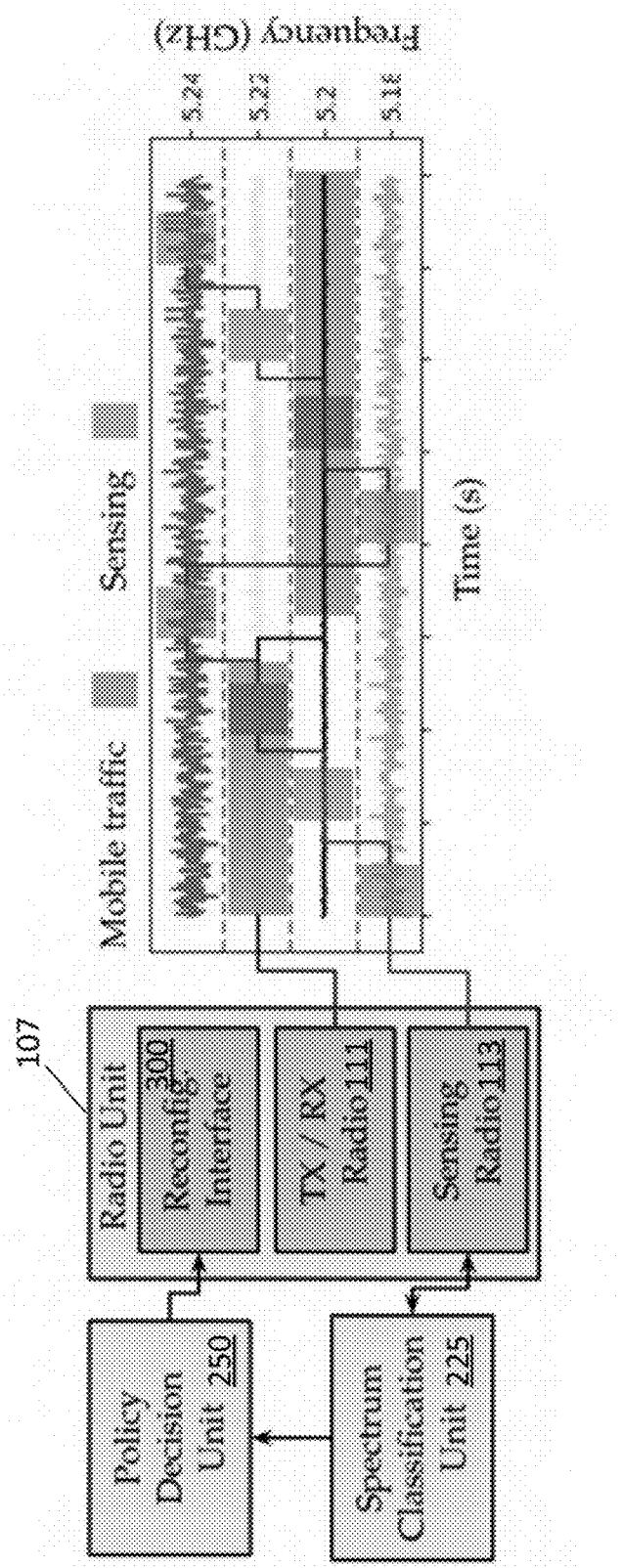
FIG. 4 illustrates ChARM prototype components and their interactions.

ChARM was tested in the context of spectrum sharing in the license-free industrial, scientific and medical (ISM) bands, where a 5G O-RAN cellular network (hereafter referred to as LTE for simplicity), Wi-Fi users and incumbent spectrum licensees need to share the same spectrum and thus coexist with each other. FIG. 4 depicts the components of the ChARM prototype and their main interactions. FIG. 4 depicts interactions of ChARM with the channel: mobile communication and sensing. The image illustrates the inter-frequency spectrum optimization introduced above. ChARM addresses that challenge by dynamically reconfiguring the mobile traffic to handover to the unoccupied sensed frequency. In this scenario, the radio unit (RU) 107 is composed by a reconfiguration interface 300, a sensing radio 113 and a TX/RX 111 radio. The sensing radio 113 periodically listens to the channel and feeds the received waveform to the spectrum classification unit (SCU) 225, which then sends its inference to the policy decision unit (PDU) 250. The latter then interacts with the RU 107 through the interface, which lets the TX/RX 111 radio switch channel according to a given policy. In these experiments, a policy function was used that was based on a ranking of traffic classes. The two rankings used in the shown experiments are presented in Table 1.

TABLE 1

Class rankings to be used for policy.
Higher values imply higher preference.

| | | |
|---|---|---|
| (A) | Clear | 3 |
| | WiFi | 2 |
| | LTE | 1 |
| | Unknown | 0 |
| (B) | Clear | 3 |
| | WiFi | 1 |
| | LTE | 2 |
| | Unknown | 0 |

Figure 5:
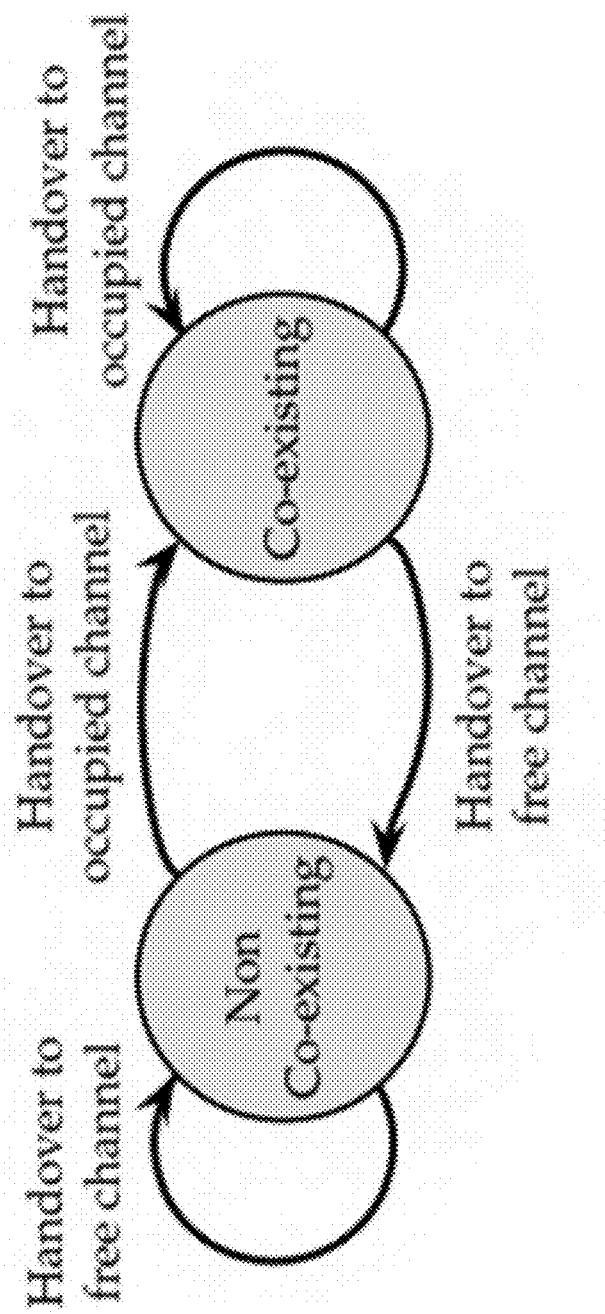
FIG. 5 illustrates intra-channel co-existence wherein transitions are consequences of handovers.

Procedure 2 depicts ranking-based policy function, whose goals are (i) to switch to more favorable frequencies according to the priority defined in Table 1, and (ii) activate the LTE or WiFi co-existing mode if switching to an already occupied frequency. The activation/de-activation of the co-existing mode is depicted in FIG. 5.

Note that switching to a frequency whose incumbent technology is unknown is purposely avoided to avoid unpredictable communication results. At line 2 of Procedure 2, the current classification for the frequency used for the communication is determined. Because the DNN classifies interference with the unknown class, as soon as the system detects unknown or WiFi communications on the currently used frequency (while in non-co-existing mode), it reacts by switching channel, possibly switching also to co-existing mode. Conversely, if ChARM is in co-existence, and it detects a clear channel, it swiftly performs a handover to occupy it. Even if the framework includes functions for tweaking base station (BS) gain and bandwidth, the standard values were always chosen for the experiments because use of such functions would unnecessarily complicate the policy logic for the purpose of this work.

Procedure 2 Ranking-based policy used in the experiments.

1: procedure RANK POLICY(channel classes, curr f req)
2:    curr class ← get class(channel classes, curr f req)
3:    if curr class = (WiFi|Unknown) then
4:        freq, class ← max (channel classes) // (wrt Tab. I)
5:        if coexisting then // currently in co-existence
6:            if class = CLEAR then
7:                return(freq, F ALSE, std_gain, std_bw)
8:            else // new interference detected
9:                if best_class = CLEAR then
10:                   return(freq, F ALSE, std_gain, std_bw)
11:               else if best_class != UNKNOWN then
12:                   if best_class = LTE then
13:                       return(freq, LTE, std_gain, std_bw)
14:                   else
15:                       return(freq, WiFi, std_gain, std_bw)
16:    return(curr_freq, coexisting, std_gain, std_bw)

To classify unknown classes, a classification mechanism for abstain class called ES was used. ES is the simplest way to compute an uncertainty score for a prediction, by evaluating the entropy of the predicted probability. the DNN outputs three numbers, which represent the probabilities of the input data to belong to, respectively, clear, LTE or WiFi channels. Let these probabilities be $p_0$, $p_1$, $p_2$ respectively, then the entropy is defined as:

$$H = -\sum_{i=0}^{2} p_i \log p_i$$

where H represents the uncertainty score, lower values mean the DNN is more confident of the classification. Validation of the model allows the selection of a hyper-parameter a, and the classification is ultimately defined by:

$$\text{class} = \begin{cases} \arg\max_{i=0,1,2} p_i, & \text{if } H < \alpha \\ 3, & \text{otherwise} \end{cases}$$

where 0,1,2,3 represent respectively the clear, LTE, WiFi and unknown classes. The prototype was implemented by leveraging srsRAN (https://www.srsran.com/), an extension of srsLTE. Four frequencies (5.18, 5.20, 5.22, 5.24 GHz), equally spaced by 20 MHz, which coincide with the channels in the LTE band 46 and Wi-Fi channels were considered. Thus, 20 MHz was selected as the bandwidth of the sensing radio 113. The interface of srsRAN was extended to support two additional commands (i) change the frequency of a specific cell; (ii) trigger the handover of the UEs from one specific cell to another.

Colosseum Modifications and Data Collection

Training a DNN requires labelled ground-truth data that is realistic and as less affected by interference as possible. For this reason, the Colosseum testbed was used to meet both requirements. In Colosseum, COTS software can be deployed and run remotely; at the same time, the radio frequency channel is emulated, and real-world wireless communications can be elaborated while being protected from interference. Thanks to the MCHEM, Colosseum is a large-scale wireless network emulator, originally designed and deployed to support DARPA's spectrum collaboration challenge in 2019. Colosseum servers and USRP SDRs allow researchers to experiment with wireless software and protocol stacks; in particular, Colosseum has already been employed for mobile networking with srsRAN.

Figure 6:
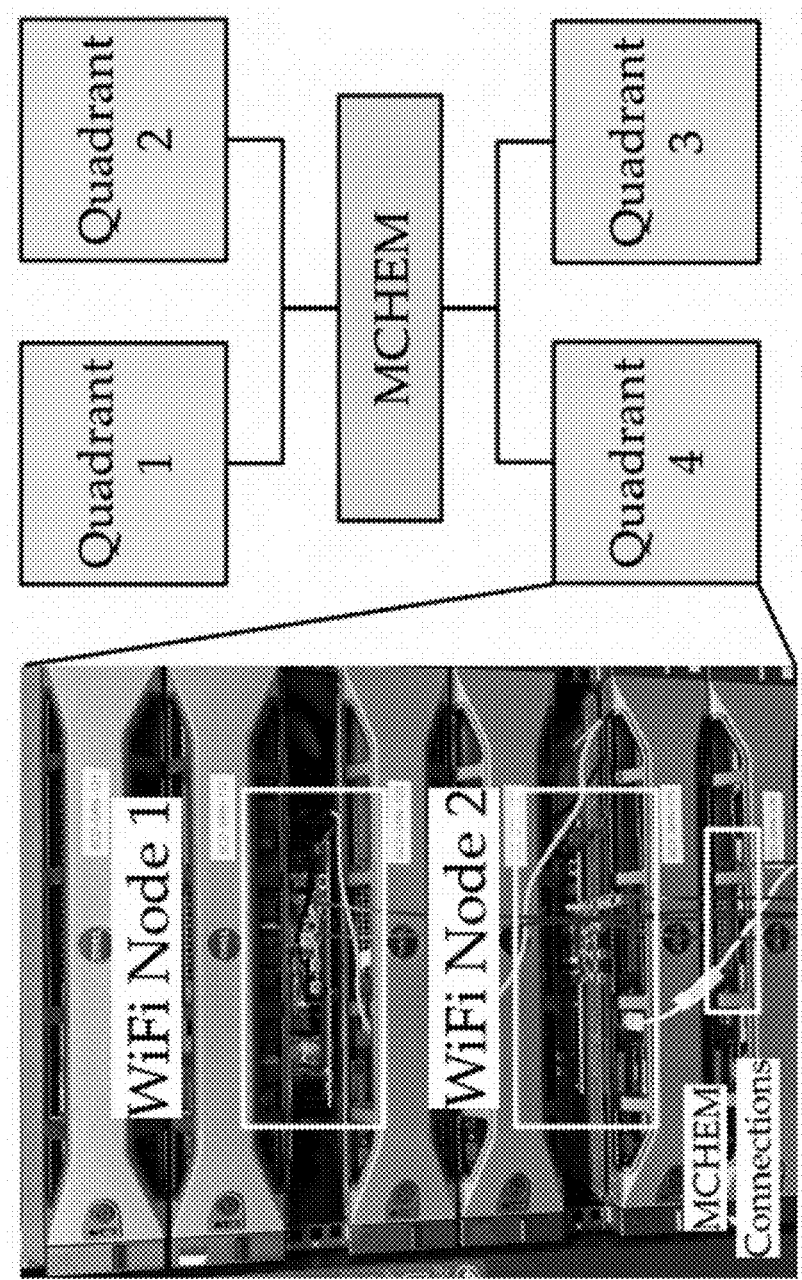
FIG. 6 illustrates modifications to Colosseum for Open-WiFi devices.

On the other hand, the strict timing requirements of 802.11 channel access mechanisms such as CSMA prevent the compliant implementation of the 802.11 stack with SDRs. In particular, 802.11 requires the reception of an acknowledgement packet for each frame sent, within 10 µs from the frame successful transmission. To this end, a Xilinx ZC706, a SoC board fully supported by the OpenWifi project, was used. A hardware extension of Colosseum for working with WiFi nodes was also designed and deployed, as depicted in FIG. 6. This extension opens up new experiment opportunities for the whole research community working with 802.11 and spectrum sharing. The combination of the ZC706 and OpenWifi allows Colosseum to support fully compliant WiFi devices and communications.

As far as data collection is concerned, three groups of spectrum data were collected, namely background noise (clear), LTE data traffic, and WiFi data traffic. The data captures the general characteristic of LTE and WiFi transmissions, abstracting from the actual transmitted information, and throughput. srsRAN was used for cellular communications and OpenWifi for 802.11. Four classes of data were collected:

1. Network with Idle traffic;
2. Continuous high-throughput traffic (iperf3, 1 Mbps);
3. bursty high-throughput traffic (ping, flooding of packets of 1 KB);
4. bursty low-throughput traffic (ping, packets of 300 bytes).

The first class of data is meant to allow the DNN to learn of possibly idle base stations or access point that are not transmitting, but that could be potentially impacted by ChARM activity. The second and third class of data are meant to represent generic transmissions of random data. The fourth class is similar to the third, and it is used only for experiments as evidence that ChARM is not over-fitting over a particular class of communication patterns, but it is able to extract the crucial wireless technology characteristics from the I/Q samples.

Overall, the collected dataset includes of 172.8 GB of data, representing 43.2 billion I/Q samples, and 18 minutes of communications. Samples were not collected for the "unknown" class. During data collection, Colosseum was configured to work at 5.24 GHz without path loss emulation, and five of its nodes (two for LTE communication, two for WiFi communication, and another for data recording) were used.

Experimental Evaluation

The following paragraphs describe, first, the experiments which have led to the ChARM DNN design for technology classification. Then the ChARM prototype performance in the controlled Colosseum emulator environment is described. In particular, various features and behaviors ChARM can offer to mobile networking spectrum sharing are detailed. Third, the developed prototype of ChARM is described as demonstrated on an over-the-air, real-world environment through the use of the Arena testbed.

DNN Training and Testing Procedures

As far as the training of the DNN is concerned, the DNN training iterations were adaptively stopped whenever no sensible progress was gained for a large number of epochs. At the end, the network parameters were saved with the best validation results. The Adam optimizer was found to be a stable and effective choice and was used in connection with this work. The dataset was split in the following way: 50% for training, 25% for validation, and 25% for testing.

Test-$\alpha$ dataset and a selection. The ES method employed on the DNN for the abstain class requires the parameter selection for a. A new dataset, called test-$\alpha$, was created, including the test set plus a combination of LTE traces, representing LTE interference (the latter accounting for the 25% of test-$\alpha$). While the test dataset is used to evaluate the accuracy of the resulting DNNs, the test-$\alpha$ dataset is used to tune the parameter a. Specifically, after the model was trained using the training set, checking the accuracy on the validation set, the value of a was computed which granted the higher accuracy score on the test-$\alpha$ dataset, and that value was used consistently with the model when evaluating the test set.

Model Selection. The investigation focused on residual networks (RNs) and convolutional neural networks (CNNs). Since the prototype senses a bandwidth of 20 MHz, it receives a stream of 20M I/Q samples per second from the sensing radio 113. Therefore, when the DNN input size is 2,000, it represents one tenth of millisecond of communication, and, when it is 20,000, it represents one millisecond. Table 4 shows the two DNN architectures used throughout.

TABLE 2

CNN (A) and RN (B) architectures of two DNN network layouts used.

| (A) | Layer | Output dim. |
| --- | --- | --- |
| | Input | 2 × 20000 |
| | Conv (ReLU) | 7 × 20000 |
| | MaxPool | 7 × 10000 |
| | Conv (ReLU) | 7 × 10000 |
| | MaxPool | 7 × 2000 |
| | Conv (ReLU) | 7 × 2000 |
| | MaxPool | 7 × 1000 |
| | Conv (ReLU) | 7 × 1000 |
| | MaxPool | 7 × 200 |
| | Conv (ReLU) | 7 × 200 |
| | MaxPool | 7 × 100 |
| | Conv (ReLU) | 7 × 100 |
| | MaxPool | 7 × 20 |
| | Conv (ReLU) | 7 × 20 |
| | MaxPool | 7 × 10 |
| | FC/Tanh | 18 |
| | FC/Tanh | 16 |
| | FC/Softmax | 3 |
| (B) | Layer | Output dim. |
| | Input | 2 × 20000 |
| | ResidualStack | 4 × 10000 |
| | ResidualStack | 4 × 2000 |
| | ResidualStack | 4 × 1000 |
| | ResidualStack | 4 × 200 |
| | ResidualStack | 4 × 100 |
| | ResidualStack | 4 × 20 |
| | ResidualStack | 4 × 10 |
| | FC/Tanh | 16 |
| | FC/Tanh | 16 |
| | FC/Softmax | 3 |

First, performance of the CNN and RN approaches were evaluated against each other. Table 2 shows the trade-off between input size and achieved accuracy by RN and CNN.

Figure 7:
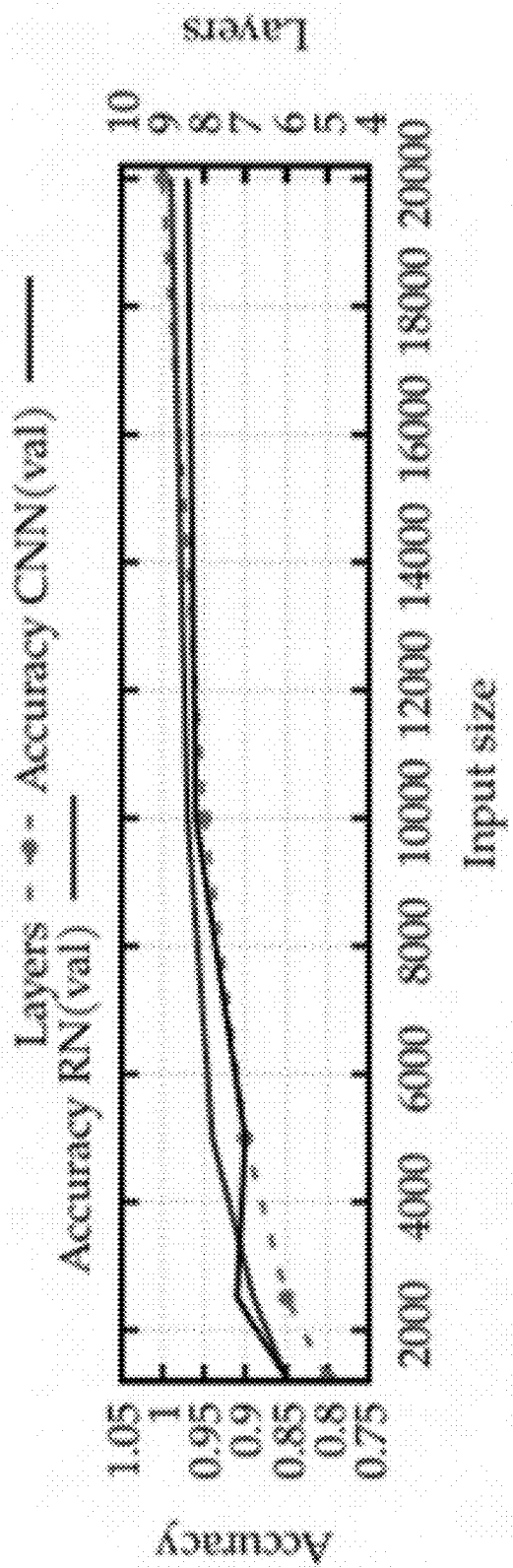
FIG. 7 illustrates accuracy of a validation set for RN and CNN networks varying the input size.

In these experiments, the number of hidden layers of the models was varied according to the input size to grant always the finest degree of analysis (i.e., the kernel size of the convolutional layers was not increased). During these experiments, RNs performed consistently better than CNNs and reached an accuracy of 99% in the validation set. As shown in FIG. 7, as expected, higher accuracy corresponds to a larger input size. As shown in FIG. 7, a validation set of 20,000 samples is representative enough to reach almost perfection on the validation set, without excessively impacting the processing time (sensing time is 1 millisecond, and processing time in the same order of magnitude). For the sake of clarity, the results shown here relate to RNs and CNNs with comparable number of parameters (about 3,000). The two network architectures achieving the highest accuracy are shown in Table 2.

Figure 8:
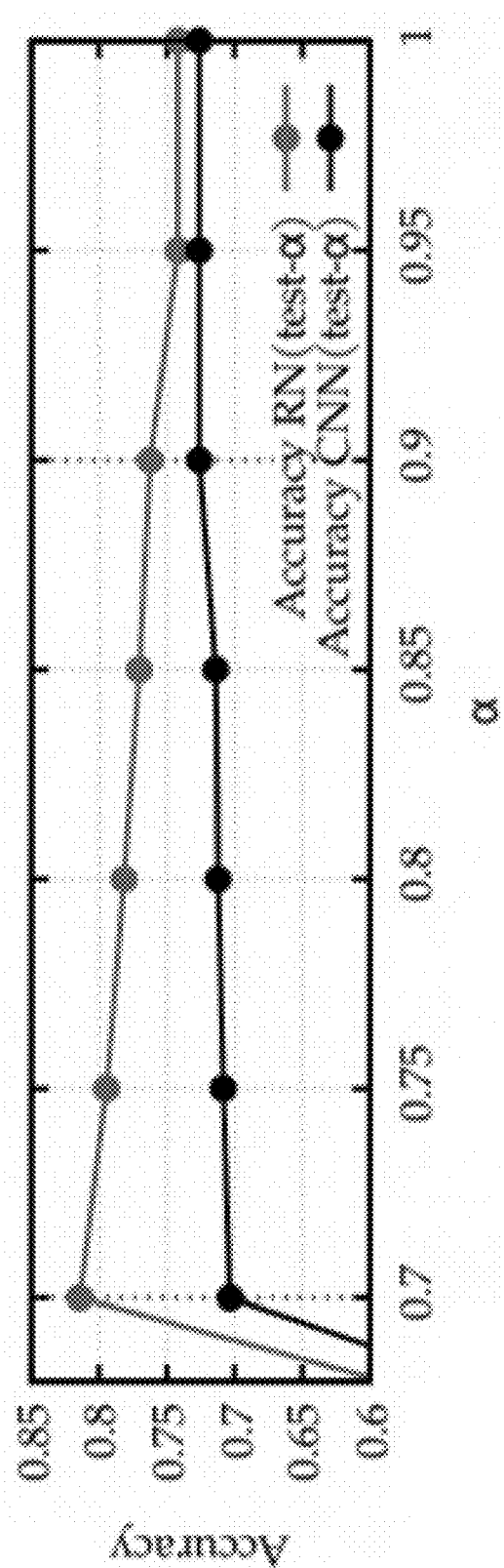
FIG. 8 illustrates accuracy of a test-$\alpha$ set for RN and CNN models varying a wherein dashed lines intersect the maxima.
Figure 9:
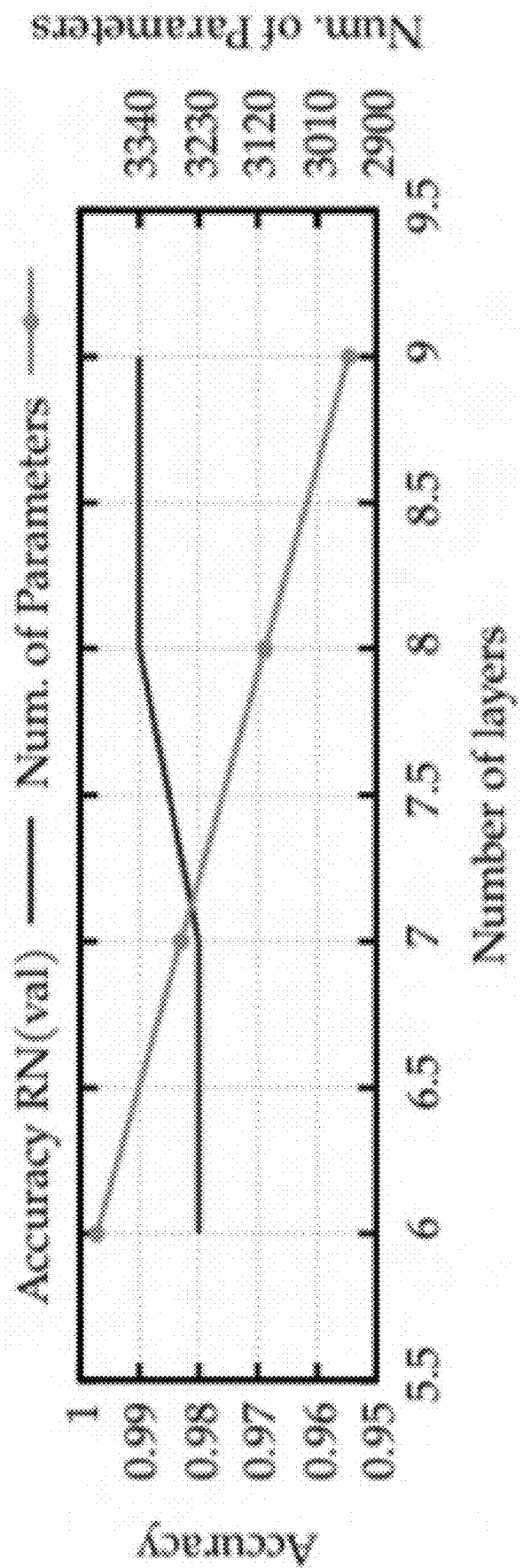
FIG. 9 illustrates accuracy of a validation set for RN models varying the number of hidden layers.

After selecting the network architecture and training the models, the a parameter is tuned. FIG. 8 presents an analysis for parameter selection on the previously most successful models. The RN model achieves the best results with $\alpha=0.7$, while the CNN model requires $\alpha=0.9$. This difference means that RN is more confident on its prediction, hence, it requires less account for uncertainty. Overall, the RN model obtains better performance and, for this reason, RN was selected as the architecture of choice for ChARM. FIG. 9 shows the performance variation when keeping input size to 20,000 while varying the number of layers, meaning opting for larger convolutional kernels. Results show there is little appreciable variation, except for the number of parameters, which increases with larger kernels. The best RN model (architecture shown in Table 2(B), $\alpha=0.7$) scores an accuracy of 96.4% on the test set. Table 3 shows the resulting confusion matrix for the model, and Table 4 confirms that it is not biased toward any class.

TABLE 3

Confusion matrix of DNN on the test set.

|  | Clear | LTE | WiFi | Unknown |
|---|---|---|---|---|
| Clear | 87,202 | 2 | 110 | 2,686 |
|  | (32.3%) | (0%) | (0%) | (1%) |
| LTE | 3 | 88,908 | 104 | 985 |
|  | (0%) | (32.9%) | (0%) | (0.4%) |
| WiFi | 577 | 152 | 84,066 | 5,205 |
|  | (0.2%) | (0.1%) | (31.1%) | (1.9%) |

TABLE 4

Recall, Precision and F1 measures for DNN on the test set.

| Technology | Recall | Precision | F1 |
|---|---|---|---|
| Clear | 0.9689 | 0.9934 | 0.981 |
| LTE | 0.9879 | 0.9983 | 0.9931 |
| WiFi | 0.9341 | 0.9975 | 0.9648 |

Sensing and Reacting

The spectrum optimization capabilities of ChARM are described in detail below. Specifically, ChARM was tested in a controlled environment in order to (i) emulate corner spectrum conditions, and (ii) obtain repeatable results. Colosseum was leveraged because it enables fine-grained control over the wireless environment. It was demonstrated that ChARM can:

(a) detect interference on its communication channel,
(b) perform a handover of the existing mobile communication to a difference frequency,
(c) change its mode to co-existence if switching to an already occupied frequency, and
(d) make choices of frequency and whether to enable co-existence that are close to the optimum (for a given policy).

The experiments started with the RU transmitting on the unoccupied 5.18 GHz channel, along with other two transmissions on 5.22 and 5.24 GHz. LTE and WiFi transmissions were recorded using Colosseum (4th class of the dataset, not used for training/validating/testing of the model) and are used in place of real nodes to make the experiment finely controlled and reproducible. During the duration of the experiment, an active communication between the ChARM BS and a srsRAN UE was kept using a ping session. Such continuous communication was logged to check whether data was lost due to interference and handovers. Extensive experimentation was conducted using Colosseum, testing different scenarios to stress ChARM. Results are presented from two sessions that highlight all the aspects ChARM and demonstrate capabilities (a)-(d) above.

Figure 10:
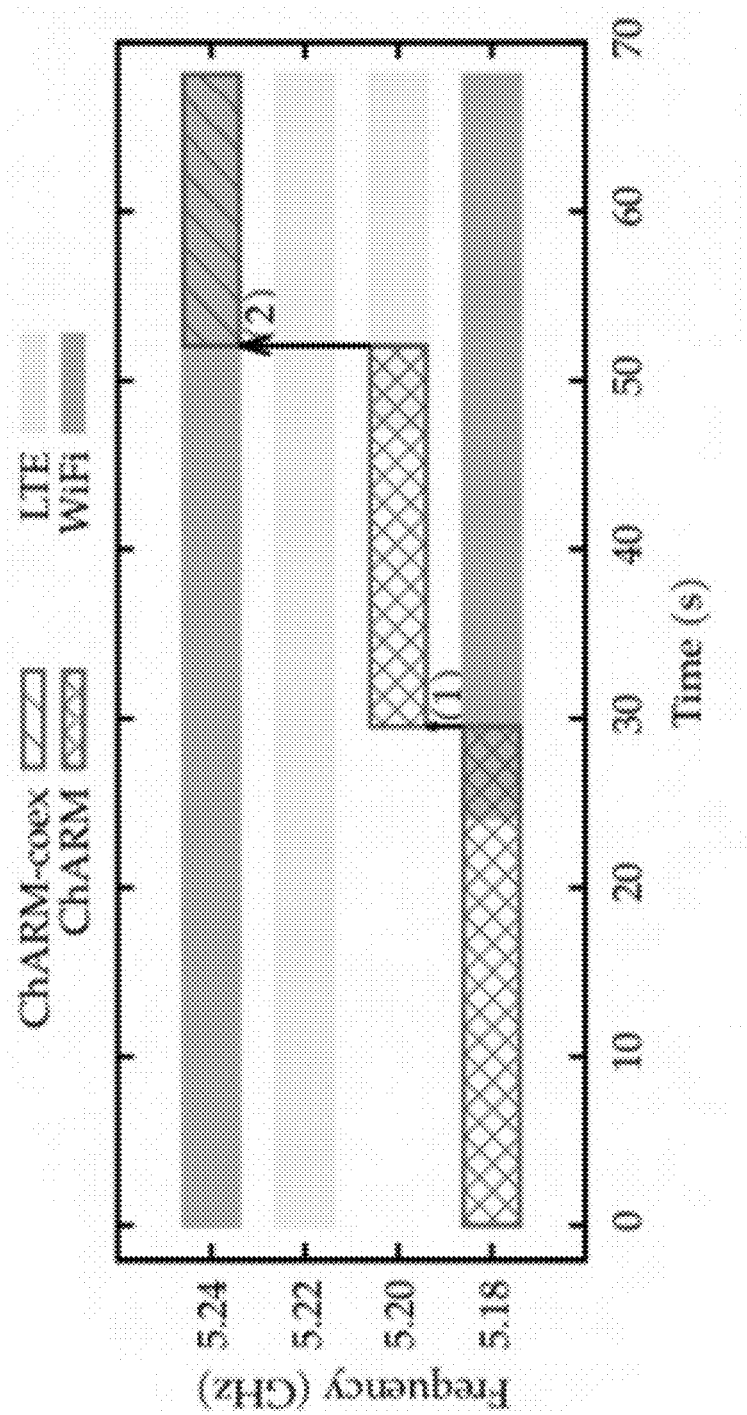
FIG. 10 illustrates frequency occupancy during an experiment on Colosseum wherein reported transmission classes are the ground-truth, arrows indicate the triggering of handovers, and the policy used is based on Table 1(A).

FIG. 10 shows the channel transmissions during one of the experiments. Around the 24th second, an interfering WiFi transmission starts at frequency 5.18 GHz, the same that ChARM is using. It takes a few seconds—i.e., the overlapping boxed area in—for ChARM to detect interference and trigger a handover, indicated by arrow number 1. The detection of interference demonstrates capability (a), while the 3GPP standardized inter-cell handover guarantees continuity of the data communication between ChARM and the attached UE, demonstrating capability (b). ChARM handovers to frequency 5.2 GHz, which according to the policy defined by Table 1(A), is the best choice, and does not require a co-existence mechanism. Around the 52nd second, an interfering LTE transmission starts on the same frequency as ChARM. After a few seconds—shown in FIG. 10 by the second overlapping area—ChARM correctly detects interference with another LTE network and triggers a handover, indicated by arrow number 2. Capabilities (a) and (b) are further demonstrated, as ChARM detects the interference (a) and seamlessly perform a 3GPP handover (b). In this case, since there are no unoccupied frequencies among those under evaluation, ChARM follows the policy in Table 1(A) and switches to 5.24 GHz. Since ChARM detects an existing WiFi communication there, it activates the co-existence mode, hence demonstrating capability (c). It is worth noting that the choices performed by ChARM are optimal with respect to the policy. In addition to the intervals for which the delay in channel sensing prevents the correct classification of channel occupancy, ChARM detects the correct underlying traffic, switches to the expected frequency given the policy, and activates the appropriate co-existence mode when needed, demonstrating capability (d).

Figure 11:
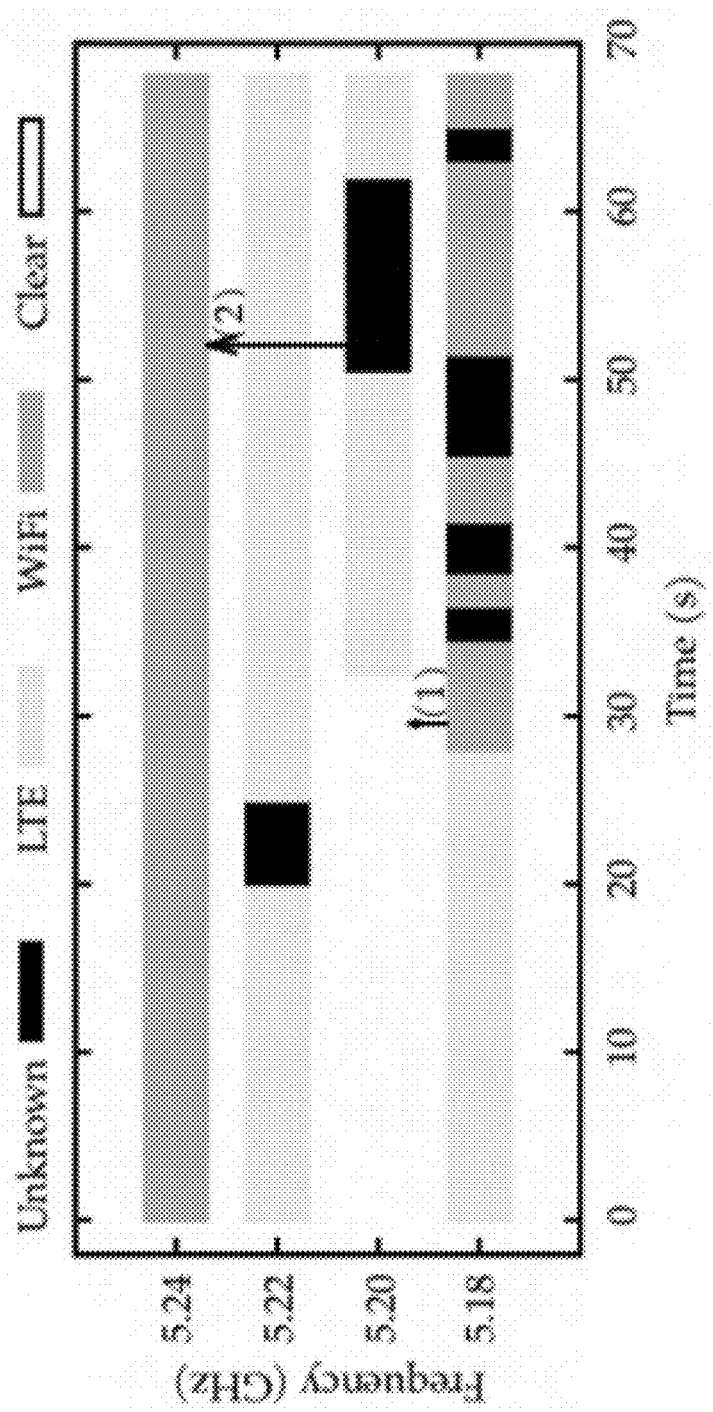
FIG. 11 illustrates ChARM DNN frequency classification through an experiment wherein arrows indicate the triggering of handovers.

While FIG. 10 presents the objective development of the experiment, FIG. 11 illustrates the classification outcomes of the DNN throughout the experiment. Specifically, the interference detection, determining the triggering of the handovers (arrows 1 and 2 as shown in FIG. 11), and some misclassification of LTE and WiFi communications as unknown technologies did occur.

TABLE 5

Confusion matrix for ChARM classification during an experiment.

|  | Clear | LTE | WiFi | Unknown |
|---|---|---|---|---|
| Clear | 30 (11.2%) | 0 (0.0%) | 0 (0.0%) | 0 (0.0%) |
| LTE | 2 (0.7%) | 106 (39.6%) | 0 (0.0%) | 14 (5.2%) |
| WiFi | 0 (0.0%) | 0 (0.0%) | 76 (28.4%) | 13 (4.9%) |
| Intrf | 0 (0.0%) | 8 (3.0%) | 17 (6.3%) | 2 (0.7%) |

Figure 12:
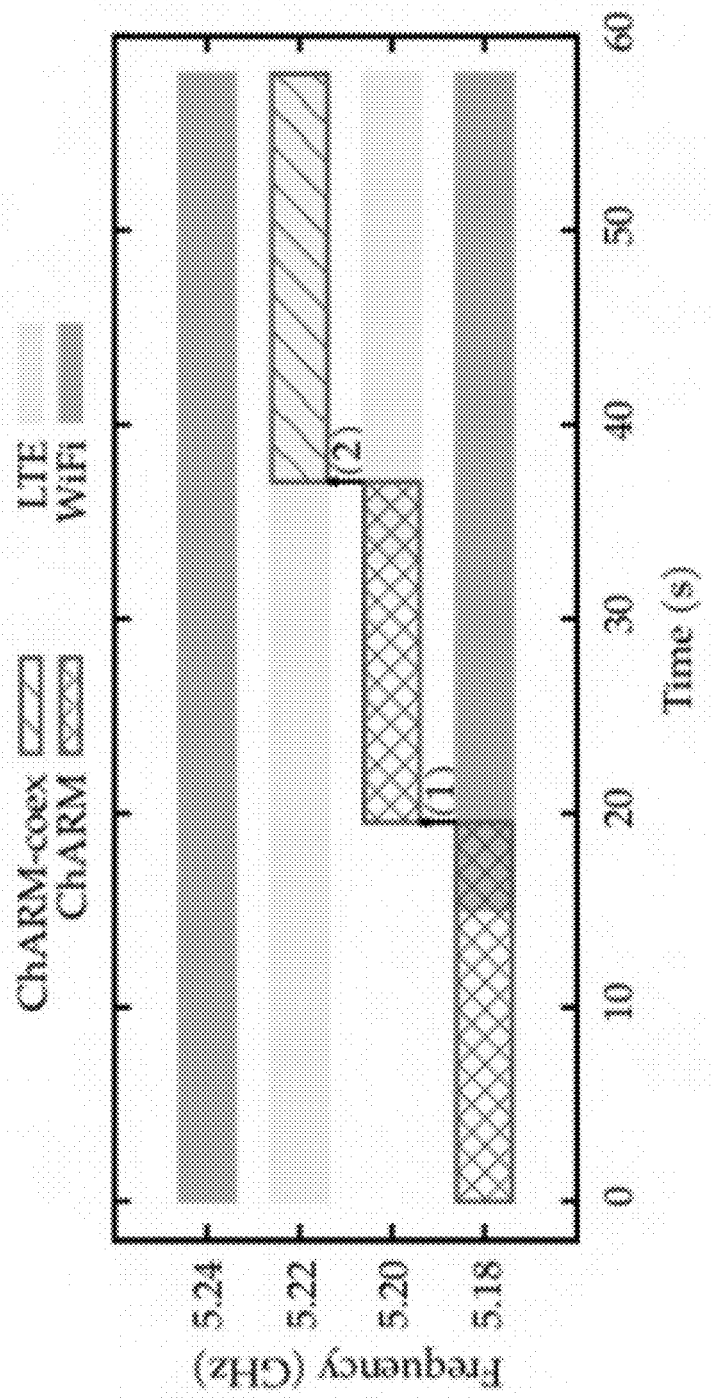
FIG. 12 illustrates Frequency occupation during an experiment on Colosseum wherein reported transmission classes are the ground-truth, arrows indicate the triggering of handovers, and the policy used is based on table 1(B).

Table 5 presents the performance of the DNN during the experiment in terms of classification confusion matrix. As expected, the main source of misclassification stems from uncertainty in the interference and the abstain classes. FIG. 12 presents another run showing the flexibility of ChARM, where Table 1(B) is enacted. In the spirit of O-RAN networks, it is demonstrated that a simple change in the policy determines the preference of ChARM for co-existing with LTE technologies in place of WiFi, without any significant structural change.

Over-the-Air Experimental Evaluation on Arena

Figure 13:
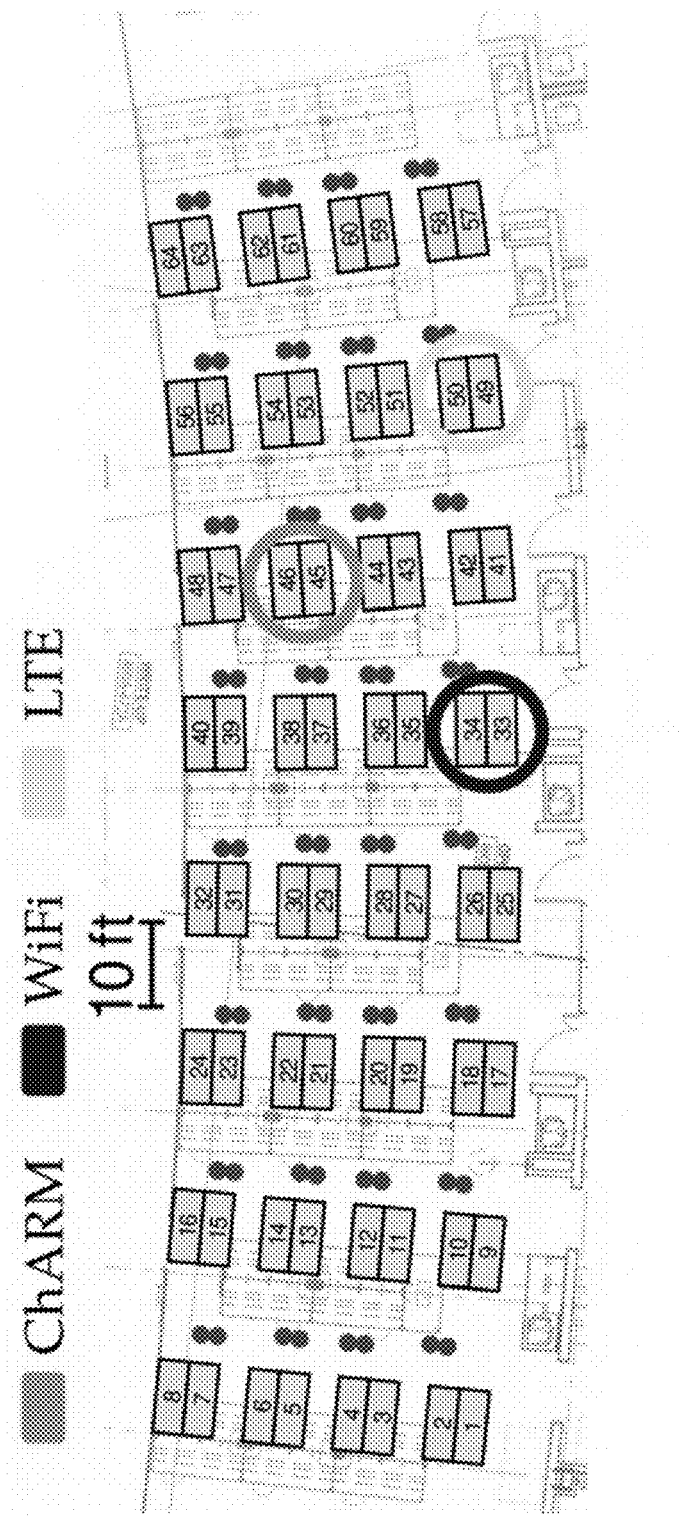
FIG. 13 illustrates location of the wireless nodes in an Arena testbed.

The Arena testbed was leveraged to perform over-the-air testing of ChARM. Arena is a remotely accessible and open testbed made up of 64 SDRs and 8 servers designed for experimenting with 5G-and-beyond spectrum research. It allows the deployment and testing of communication platforms in a real office environment during working hours, subject to all sort of ISM interference. The antennas are installed in a large, shared office, displaced along a grid, as represented in FIG. 13. The positioning in the grid of the nodes used in the experiments is also shown in FIG. 13.

While Colosseum allows experimenting in a fully controlled environment, Arena allows the testing of the system in a more realistic and challenging environment. presents the deployment of ChARM in Arena, including the location of the LTE and WiFi transmitting nodes. 5.24 GHz was chosen as the center frequency. To generate the LTE and WiFi traffic, traffic traces from the dataset are used. While the experiments on Colosseum show the behavior of ChARM and its ability to optimize the spectrum use, the experiments on Arena validate that the DNNs are still effective in a real-world environment. No data has been collected on Arena and used for the training of the model.

Figure 14:
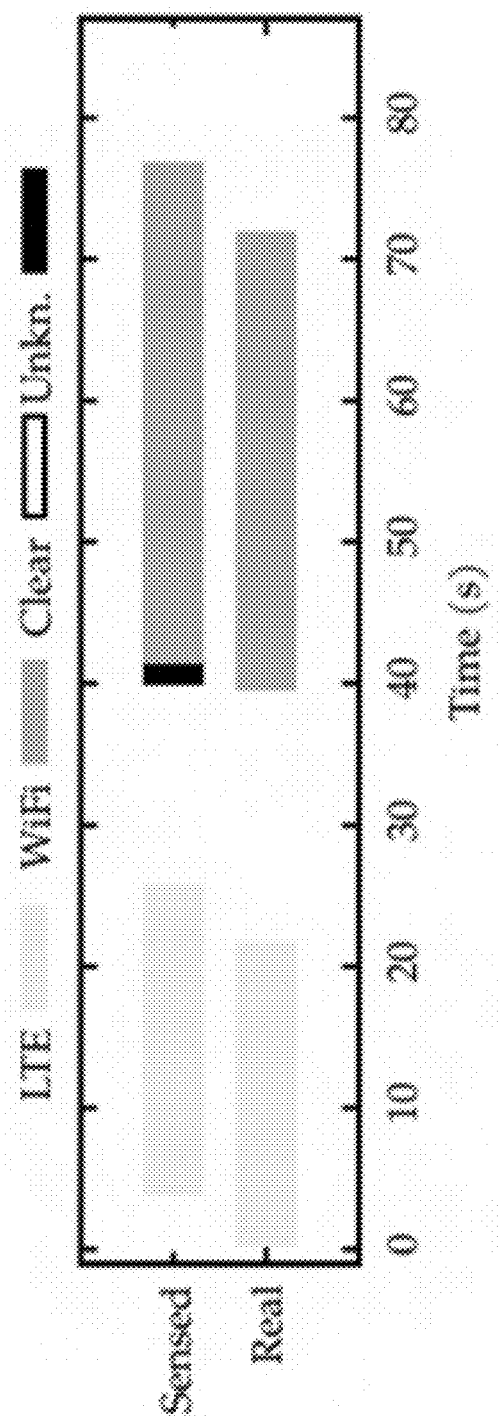
FIG. 14 illustrates results from a sensing experiment on the Arena testbed at 5.24 GHz, with 20 MHz of bandwidth, wherein LTE and WiFi communication recordings (indicated as Real transmissions) were played out and ChARM classification (sensed) was verified.
Figure 15:
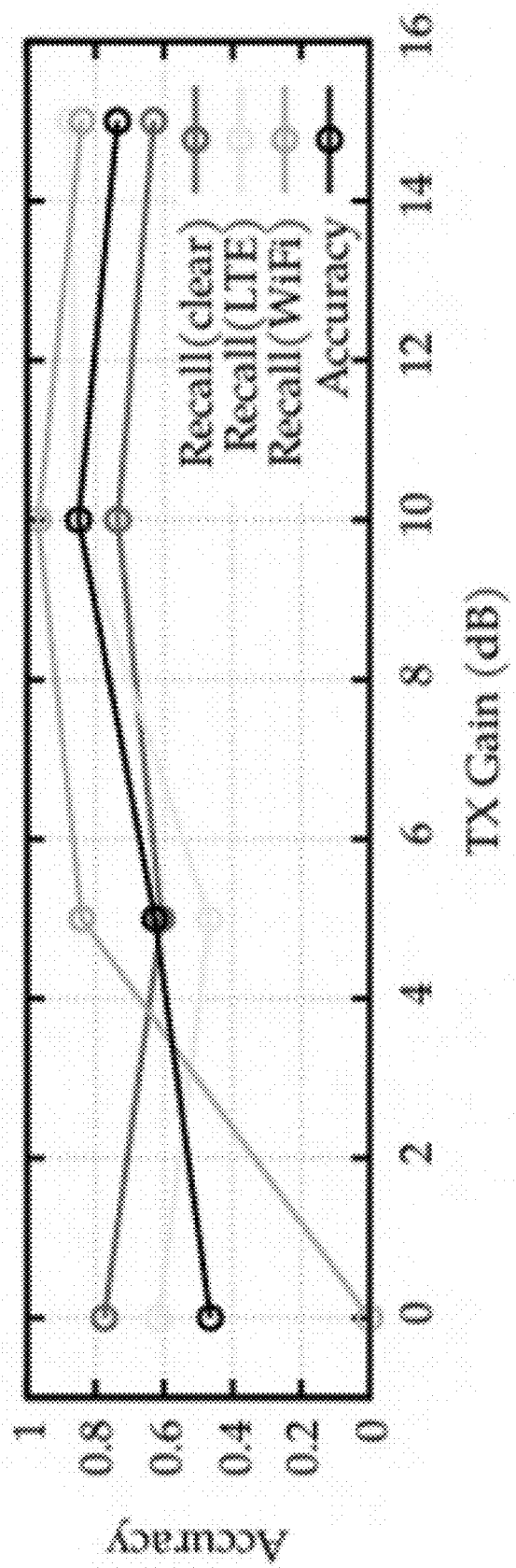
FIG. 15 illustrates accuracy and recall of ChARM DNN obtained in a wireless testbed for a single channel (5.24 GHz) wherein the TX Gain is with respect to an original transmission on Colosseum.

To compensate the path loss in Arena with respect to Colosseum, the transmissions are amplified by 10 dB. For the targeted LTE and WiFi transmission configurations (in terms of bandwidth parameters, LTE physical channel allocation, and WiFi modulation scheme) and transmission power, results shown in FIG. 14 confirm that ChARM can reliably detect the technologies obtaining an accuracy of 85%. Variations in the transmission configuration or abrupt changes in the transmission power can however reduce the classifier performance, as shown in FIG. 15. Thus, it is important to tune the DNN training with respect to the target environment characteristics, and future work will investigate how online training can be used to automatically tailor the performance of ChARM.

As described herein, Channel-Aware Reactive Mechanism (ChARM) is a data-driven O-RAN-compliant framework that allows (i) sensing of the spectrum to understand the current context and (ii) reacting in real time by switching the distributed unit (DU) and RU operational parameters according to a specified spectrum access policy. It is designed to operate within the O-RAN specifications and can be used in conjunction with other spectrum sharing mechanisms. The performance of ChARM was demonstrated in the context of spectrum sharing among LTE and Wi-Fi in unlicensed bands, where a controller operating over a RAN Intelligent Controller (RIC) senses the spectrum and switches cell frequency to avoid Wi-Fi. A full-fledged standard-compliant prototype of ChARM using srsRAN was presented, and description of testing leveraging the Colosseum channel emulator to collect a large-scale waveform dataset to train neural networks was presented. To collect standard-compliant Wi-Fi data, the Colosseum testbed was extended using system-on-chip (SoC) boards running a modified version of the OpenWiFi architecture. Experimental results show that the neural networks discussed herein achieve accuracy of up to 96% on Colosseum and 85% on Arena, demonstrating the capacity of ChARM to fully exploit the considered spectrum channels.

In summary, the described channel-aware reactive mechanism (ChARM) is a dynamic wireless communication reconfiguration mechanism leveraging machine learning for classifying the communication traffic on a set of given frequencies and changing the wireless channel properties on the fly with the goal of improving wireless spectrum sharing. ChARM performs both intra- and inter-frequency spectrum sharing techniques. It is 3GPP compliant and designed to be deployed in a O-RAN network infrastructure.

The Channel-Aware Reactive Mechanism (ChARM) includes a deep neural network (DNN) trained to classify communication technologies (for the prototype, LTE and Wi-Fi traffic were targeted). ChARM periodically senses frequencies under evaluation and uses the DNN to classify them. Mobile network operators (MNO) can define a function to customize the reactions ChARM can undertake. ChARM can (i) change the on-going communication frequency, (ii) activate a co-existence mechanism, (iii) change the transmission power and/or transmission gain, and (iv) change the channel bandwidth.

For the reconfiguration of the communication frequency to be 3GPP standard compliant, a new control interface must be added to the Distributed Unit (DU). With ChARM, each Radio Unit (RU) manages two mobile cells; one is used for communication with the user equipment (UE) while the other is kept idle. When a change of frequency is performed, the DU dictates the RU to switch the idle cell to the target frequency, and then it commits a 3GPP compliant intra-eNB handover to the UEs of the active cell to the idle one. The two cells switch the roles.

Further Example Features

ChARM senses the spectrum and dynamically reconfigures the wireless communication channel.

ChARM DNN classifies traffic and accounts for an "abstain class," targeting the technologies not directly considered during the training.

ChARM is designed to be integrated in the O-RAN framework.

ChARM behavior can be customized by the MNO through the definition of a policy function.

Further Example Advantages

Spectrum scarcity is a pressing challenge for the wireless research community, and ChARM addresses it through intra- and inter-spectrum sharing techniques.

ChARM's demonstrated ability to reconfigure the wireless communication dynamically and hence optimize the user experience is a completely novel contribution.

ChARM's accounting for unknown technologies is a significant improvement over spectrum sharing techniques operating in unlicensed (or shared) bands.

ChARM enables the dynamic reconfiguration of the channels based on the online sensing of the occupied frequencies.

Example Uses

ChARM can be deployed by MNO to optimize the spectrum usage in wireless networks.

ChARM can be employed in the Industrial Scientific Medical band, as well as in other shared bands.

ChARM can be employed in intelligent mobile network base stations and devices.

ChARM can be employed in mobile network operator centralized orchestration nodes.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

To the extent that the appended claims have been drafted without multiple dependencies, this has been done only to accommodate formal requirements in jurisdictions that do not allow such multiple dependencies.

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A method for frequency sharing in radio access networks (RANs) using artificial intelligence comprising:
    scanning, by a spectrum classification unit (SCU) of a channel-aware reactive mechanism (ChARM) app, a plurality of frequencies associated with ongoing communication, the ChARM app executable in the RAN via one or more of a near-RT RIC, a distributed unit (DU), a radio unit (RU), or combinations thereof;
    classifying, by a deep neural network (DNN) of the SCU, I/Q samples of each of the scanned frequencies, the DNN executable via the one or more of the near-RT RIC, the DU, the RU, or combinations thereof;
    receiving, at a policy decision unit (PDU) of the ChARM from the SCU, the classified frequencies;
    applying, by the PDU, an embedded policy to the classified frequencies;
    transmitting commands from the PDU to a distributed unit (DU) of the RAN for making changes to the ongoing communication according to the applied policy;
    receiving, at a control interface implemented in the DU, the commands transmitted by the PDU; and
    changing, by the DU according to the commands, an operating parameter of a radio unit (RU) of the RAN.

2. The method of claim 1, wherein the DNN further comprises at least one of a convolutional neural network (CNN) and a residual network (RN).

3. The method of claim 2, wherein the DNN further comprises a fully-connected layer.

4. The method of claim 3, wherein the fully connected layer includes at least one of an FC/Tan h, or an FC/Softmax.

5. The method of claim 1, wherein the step of classifying further comprises assigning to each frequency, by the DNN, a technology label to generate an associative map.

6. The method of claim 5, wherein the policy prescribes, based on each of a plurality of possible classification-frequency combinations, changes to at least one of a frequency, an intra-frequency spectrum sharing mechanism, a bandwidth, a transmission power of the RU, or a transmission gain of the RU.

7. The method of claim 6, wherein the step of applying further comprises
    calling the embedded policy;
    executing the embedded policy against the associative map; and
    determining a prescribed one of the changes to the at least one of the frequency, the intra-frequency spectrum sharing mechanism, the bandwidth, the transmission power of the RU, or the transmission gain of the RU.

8. The method of claim 1, wherein the at least one operating parameter includes at least one of a frequency, an intra-frequency spectrum sharing mechanism, a bandwidth, a transmission power of the RU, or a transmission gain of the RU.

9. The method of claim 8, wherein the intra-frequency sharing mechanism includes at least one of LTE-U, LTE-LAA, MulteFire, increasing of ABS periods for co-existence with WiFi, or establishing of an X2 interface and subsequent coordination via 3GPP ICIC techniques for co-existence with one or more LTE base stations.

10. The method of claim 1, further comprising transmitting, from the DU via the RU, a message handover through a radio resource control (RRC) to at least one user equipment (UE) device to change an operating parameter of the UE corresponding the changed operating parameter of the RU.

11. A system for frequency sharing in open radio access network (RAN) networks using artificial intelligence comprising:
    a RAN having a plurality of RAN resources including a near-real-time (near-RT) RAN intelligent controller (RIC), a distributed unit (DU), and a radio unit (RU);
    a channel-aware reactive mechanism (ChARM) app executable in the RAN via the near-RT RIC, the DU, the RU, or combinations thereof the ChARM app including:
        a spectrum classification unit (SCU) configured to:
            scan a plurality of frequencies associated with ongoing communication; and
            execute a deep neural network (DNN) to classify I/Q samples of each of the scanned frequencies, the DNN executable via the one or more of the near-RT RIC, the DU, the RU, or combinations thereof;
        a policy decision unit (PDU) configured to:
            receive, from the SCU, the classified frequencies;
            apply an embedded policy to the classified frequencies; and
            transmit commands to the DU for making changes to the ongoing communication according to the applied policy; and
        a control interface implemented in the DU for receiving the commands transmitted by the PDU and changing, according to the commands, an operating parameter of the RU.

12. The system of claim 11, wherein the DNN further comprises at least one of a convolutional neural network (CNN) and a residual network (RN).

13. The system of claim 12, wherein the DNN further comprises a fully-connected layer.

14. The system of claim 13, wherein the fully connected layer includes at least one of an FC/Tan h, or an FC/Softmax.

15. The system of claim 11, wherein the DNN of the SCU, when classifying the I/Q samples of each of the scanned frequencies, is further configured to assign to each frequency a technology label to generate an associative map.

16. The system of claim 15, wherein the policy prescribes, based on each of a plurality of possible classification-frequency combinations, changes to at least one of a frequency, an intra-frequency spectrum sharing mechanism, a bandwidth, a transmission power of the RU, or a transmission gain of the RU.

17. The system of claim 16, wherein the PDU, when applying the embedded policy to the classified frequencies, is further configured to:
call the embedded policy;
execute the embedded policy against the associative map; and
determine a prescribed one of the changes to the at least one of the frequency, the intra-frequency spectrum sharing mechanism, the bandwidth, the transmission power of the RU, or the transmission gain of the RU.

18. The system of claim 11, wherein the at least one operating parameter includes at least one of a frequency, an intra-frequency spectrum sharing mechanism, a bandwidth, a transmission power of the RU, or a transmission gain of the RU.

19. The system of claim 18, wherein the intra-frequency sharing mechanism includes at least one of LTE-U, LTE-LAA, MulteFire, increasing of ABS periods for co-existence with WiFi, or establishing of an X2 interface and subsequent coordination via 3GPP ICIC techniques for co-existence with one or more LTE base stations.

20. The system of claim 11, wherein the DU is further configured to transmit, via the RU, a message handover through a radio resource control (RRC) to at least one user equipment (UE) device to change an operating parameter of the UE corresponding the changed operating parameter of the RU.

* * * * *